(12) United States Patent
Spanoche et al.

(10) Patent No.: US 8,482,156 B2
(45) Date of Patent: *Jul. 9, 2013

(54) THREE PHASE POWER GENERATION FROM A PLURALITY OF DIRECT CURRENT SOURCES

(75) Inventors: Sorin Spanoche, Cupertino, CA (US); Kent Kernahan, Cupertino, CA (US)

(73) Assignee: Array Power, Inc., Sunnyvale, CA (US)

( * ) Notice: Subject to any disclaimer, the term of this patent is extended or adjusted under 35 U.S.C. 154(b) by 359 days.

This patent is subject to a terminal disclaimer.

(21) Appl. No.: 12/861,815

(22) Filed: Aug. 23, 2010

(65) Prior Publication Data

US 2011/0057515 A1    Mar. 10, 2011

Related U.S. Application Data

(63) Continuation-in-part of application No. 12/555,823, filed on Sep. 9, 2009, now Pat. No. 8,089,178.

(51) Int. Cl.
*H02J 1/00* (2006.01)

(52) U.S. Cl.
USPC .......................................................... 307/82

(58) Field of Classification Search
USPC .......................................................... 307/82
See application file for complete search history.

(56) References Cited

U.S. PATENT DOCUMENTS

| | | |
|---|---|---|
| 2,726,280 A | 9/1951 | Demurjian |
| 4,354,725 A | 10/1982 | Herbaugh et al. |
| 4,375,662 A | 3/1983 | Baker |
| 4,453,383 A | 6/1984 | Collins |
| 4,649,334 A | 3/1987 | Nakajima |
| 4,719,550 A | 1/1988 | Powell et al. |

(Continued)

FOREIGN PATENT DOCUMENTS

| | | |
|---|---|---|
| DE | 102005036153 A1 | 12/2006 |
| EP | 1605512 A2 | 12/2005 |

(Continued)

OTHER PUBLICATIONS

Supplementary European Search Report issued in European Patent Application No. 09836818.6, mailed on Jun. 6, 2012.

(Continued)

*Primary Examiner* — Robert L. Deberadinis
(74) *Attorney, Agent, or Firm* — The Marbury Law Group, PLLC

(57) ABSTRACT

A direct current to pulse amplitude modulated ("PAM") current converter, denominated a "PAMCC", is connected to an individual source of direct current. The PAMCC receives direct current and provides pulse amplitude modulated current at its three output terminals, wherein the current of each terminal is one hundred twenty degrees out of phase with the other two terminals. The pulses are produced at a high frequency relative to the signal modulated on a sequence of pulses. The signal modulated onto a sequence of pulses may represent portions of a lower frequency sine wave or other lower frequency waveform, including DC. When each phased output is connected in parallel with the outputs of similar PAMCCs an array of PAMCCs is formed, wherein each voltage phased output pulse is out of phase with respect to a corresponding current output pulse of the other PAMCCs. An array of PAMCCs constructed in accordance with the present invention form a distributed three-phase multiphase inverter whose combined output is the demodulated sum of the current pulse amplitude modulated by each PAMCC on each phase.

20 Claims, 20 Drawing Sheets

U.S. PATENT DOCUMENTS

| | | | |
|---|---|---|---|
| 4,816,982 | A | 3/1989 | Severinsky |
| 4,868,379 | A | 9/1989 | West |
| 4,899,269 | A | 2/1990 | Rouzies |
| 5,001,406 | A | 3/1991 | Peterson |
| 5,017,860 | A | 5/1991 | Germer et al. |
| 5,276,706 | A | 1/1994 | Critchlow |
| 5,474,460 | A | 12/1995 | Tirrell et al. |
| 5,559,685 | A | 9/1996 | Lauw et al. |
| 5,621,300 | A | 4/1997 | Sato et al. |
| 5,642,275 | A | 6/1997 | Peng et al. |
| 5,654,883 | A | 8/1997 | Takehara et al. |
| 5,682,305 | A | 10/1997 | Kurokami et al. |
| 5,739,724 | A | 4/1998 | Alexandre et al. |
| 5,869,956 | A | 2/1999 | Nagao et al. |
| 5,892,354 | A | 4/1999 | Nagao et al. |
| 6,046,919 | A | 4/2000 | Madenokouji et al. |
| 6,111,767 | A | 8/2000 | Handleman |
| 6,172,481 | B1 | 1/2001 | Curtiss |
| 6,204,627 | B1 | 3/2001 | Watanabe et al. |
| 6,219,623 | B1 | 4/2001 | Wills |
| 6,227,914 | B1 | 5/2001 | Lee et al. |
| 6,259,017 | B1 | 7/2001 | Takehara et al. |
| 6,339,538 | B1 | 1/2002 | Handleman |
| 6,365,825 | B1 | 4/2002 | Hayashi et al. |
| 6,493,246 | B2 | 12/2002 | Suzui et al. |
| 6,545,211 | B1 | 4/2003 | Mimura |
| 6,639,413 | B2 | 10/2003 | Whitehead et al. |
| 6,690,590 | B2 | 2/2004 | Stamenic et al. |
| 6,750,391 | B2 | 6/2004 | Bower et al. |
| 6,810,339 | B2 | 10/2004 | Wills |
| 6,844,739 | B2 | 1/2005 | Kasai et al. |
| 6,892,165 | B2 | 5/2005 | Yagi et al. |
| 6,969,967 | B2 | 11/2005 | Su |
| 7,023,186 | B2 | 4/2006 | Yan |
| 7,042,195 | B2 | 5/2006 | Tsunetsugu et al. |
| 7,161,082 | B2 | 1/2007 | Matsushita et al. |
| 7,171,665 | B1 | 1/2007 | Kobayashi et al. |
| 7,191,656 | B2 | 3/2007 | Yagi et al. |
| 7,256,566 | B2 | 8/2007 | Bhavaraju et al. |
| 7,309,850 | B2 | 12/2007 | Sinton et al. |
| 7,354,306 | B2 | 4/2008 | Thorner |
| 7,372,236 | B2 | 5/2008 | Kobayashi |
| 7,406,800 | B2 | 8/2008 | Cinnamon et al. |
| 7,491,077 | B1 | 2/2009 | Yang |
| 7,550,952 | B2 | 6/2009 | Kurokami et al. |
| 7,553,182 | B2 | 6/2009 | Buck et al. |
| 7,572,133 | B2 | 8/2009 | Hughes et al. |
| 7,573,209 | B2 | 8/2009 | Ashdown et al. |
| 7,576,449 | B2 | 8/2009 | Becker et al. |
| 7,596,008 | B2 | 9/2009 | Iwata et al. |
| 7,602,156 | B2 | 10/2009 | Weng et al. |
| 7,616,467 | B2 | 11/2009 | Mallwitz |
| 7,719,140 | B2 | 5/2010 | Ledenev et al. |
| 7,719,864 | B2 | 5/2010 | Kernahan et al. |
| 7,796,412 | B2 | 9/2010 | Fornage |
| 7,843,085 | B2 | 11/2010 | Ledenev et al. |
| 7,884,500 | B2 | 2/2011 | Kernahan |
| 7,925,459 | B2 | 4/2011 | Fornage |
| 8,089,178 | B2 * | 1/2012 | Spanoche et al. ............... 307/82 |
| 2002/0030365 | A1 | 3/2002 | Underwood et al. |
| 2002/0057751 | A1 | 5/2002 | Jagger et al. |
| 2002/0080631 | A1 | 6/2002 | Kanouda et al. |
| 2004/0097914 | A1 | 5/2004 | Pantera et al. |
| 2004/0169488 | A1 | 9/2004 | Maeda et al. |
| 2004/0225225 | A1 | 11/2004 | Naumov et al. |
| 2005/0105224 | A1 | 5/2005 | Nishi |
| 2005/0139259 | A1 | 6/2005 | Steigerwald et al. |
| 2005/0172995 | A1 | 8/2005 | Rohrig et al. |
| 2005/0284517 | A1 | 12/2005 | Shinohara |
| 2006/0152085 | A1 | 7/2006 | Flett et al. |
| 2006/0162772 | A1 | 7/2006 | Presher, Jr. et al. |
| 2006/0185727 | A1 | 8/2006 | Matan |
| 2006/0239389 | A1 | 10/2006 | Coumou |
| 2006/0262576 | A1 | 11/2006 | Przybyla et al. |
| 2007/0040825 | A1 | 2/2007 | Mamba et al. |
| 2007/0119718 | A1 | 5/2007 | Gibson et al. |
| 2007/0139137 | A1 | 6/2007 | Muniraju et al. |
| 2007/0273338 | A1 | 11/2007 | West |
| 2008/0078436 | A1 | 4/2008 | Nachamkin et al. |
| 2008/0088829 | A1 | 4/2008 | Fuyuki |
| 2008/0094019 | A1 | 4/2008 | Steigerwald et al. |
| 2008/0191666 | A1 | 8/2008 | Kernahan et al. |
| 2008/0238195 | A1 | 10/2008 | Shaver et al. |
| 2008/0284595 | A1 | 11/2008 | Buchhalter |
| 2008/0306700 | A1 | 12/2008 | Kawam et al. |
| 2009/0032093 | A1 | 2/2009 | Fang |
| 2009/0160258 | A1 | 6/2009 | Allen et al. |
| 2009/0160259 | A1 | 6/2009 | Naiknaware et al. |
| 2009/0183760 | A1 | 7/2009 | Meyer |
| 2009/0290393 | A1 | 11/2009 | Angerer et al. |
| 2009/0310391 | A1 | 12/2009 | Becker-Irvin et al. |
| 2010/0139752 | A1 | 6/2010 | Fang |
| 2010/0149847 | A1 | 6/2010 | Kernahan |
| 2010/0152917 | A1 | 6/2010 | Kernahan |
| 2010/0157632 | A1 | 6/2010 | Batten et al. |
| 2010/0157638 | A1 | 6/2010 | Naiknaware et al. |
| 2010/0164288 | A1 | 7/2010 | Kernahan et al. |
| 2010/0236612 | A1 | 9/2010 | Khajehoddin et al. |
| 2010/0283325 | A1 | 11/2010 | Marcianesi et al. |
| 2011/0055303 | A1 | 3/2011 | Slavin |
| 2011/0055445 | A1 | 3/2011 | Gee et al. |
| 2011/0149610 | A1 | 6/2011 | Moussaoui et al. |
| 2011/0160930 | A1 | 6/2011 | Batten et al. |
| 2011/0216512 | A1 | 9/2011 | Vosper et al. |
| 2011/0282502 | A1 | 11/2011 | Fife et al. |
| 2011/0291480 | A1 | 12/2011 | Nair et al. |
| 2012/0268087 | A1 | 10/2012 | Kernahan |

FOREIGN PATENT DOCUMENTS

| | | |
|---|---|---|
| JP | 11-318042 A | 11/1999 |
| JP | 2000-174308 A | 6/2000 |
| JP | 2001-320884 A | 11/2001 |
| WO | 2006089794 A1 | 8/2006 |
| WO | 2007124059 A2 | 11/2007 |
| WO | 2011104253 A1 | 9/2011 |

OTHER PUBLICATIONS

International Search Report issued in PCT/US2010/47935, mailed on Jul. 12, 2011.

International Preliminary Report on Patentability issued in PCT Application PCT/US2010/047935, mailed on Oct. 31, 2011.

Kjaer, "Design and Control of an Inverter for Photovoltaic Applications", Aalborg University, Denmark, Institute of Energy Technology, Jan. 2005.

Dung Duc Nguyen, "Modeling and reconfiguration of solar photovoltaic arrays under non-uniform shadow conditions", Iris Northeastern University, Jan. 2008.

"Introduction to Strain and Strain Gages", DOC-AN00007-00, Rev B, Jul. 11, 2007, Madge Tech, Inc, 201 Route 103 West, Warner, NH 03278.

Ashok Rangaswamy, "Effect of CdC12 Treatment on CdTe and CdS Solar Cell Characteristics after Exposure to Light for 1000 Hours", University of South Florida, Jul. 11, 2003.

Bruendlinger et al., "Maximum Power Point Tracking Performance Under Partially Shaded PV Array Conditions", Technical University Berlin, Einsteinufer, 2006.

C. Liu et al., "Advanced Algorithm for MPPT Control of Photovoltaic Systems," Dept. of Electrical & Computer Engineering, Ryerson University; Canadian Solar Buildings Conference, Aug. 20-24, 2004, Montreal, Canada.

C.A.G. Castaneda, "Maximum Power Point Tracking Using Modified P&O Method for the Off Grid Radar," Master of Science in Electrical Engineering Thesis, University of Puerto Rico Mayaguez; 92pgs, 2008.

Chao et al., "An Intelligent Maximum Power Point Tracking Method Based on Extension Theory for PV Systems," Expert Systems with Applications, Copyright 2009 Elsevier Ltd.

D. Morgan, "An Investigation Into Degradation of CdTe Solar Cells", Colorado School of Mines, Golden Colorado, 1998.

Faranda et al., "Energy Comparison of MPPT Techniques for PV Systems," WSEAS Transactions on Power Systems, Issue 6, vol. 3, Jun. 2005.

G.M.S. Azavedo et al., "Comparative Evaluation of Maximum Power Point Tracking Methods for Photovoltaic Systems," Journal of Solar Energy Engineering, Aug. 2009, vol. 131.

Herrmann et al., "Hot Spot Investigation on PV Modules—New Concepts for a Test Standard and Consequences for Module Design with Respect to Bypass Diodes", Cologne, Germany.

Houghton et al, "Pulse Analysis of Acoustic Emission Signals", NASA Contractor Report 2927; USA, Dec. 1977.

International Search Report issued in PCT/US2010/035893, mailed on Dec. 1, 2010.

Kammel et al, "A Simple Glass Breakage Detector Using the MSP430", Texas Instruments, SLAA351, Apr. 2007.

Karatepe et al., "Voltage based power compensation system for photovoltaic generation system under partially shaded insolation conditions", Science Direct, Mar. 2003.

Kolakowski et al., "Two Approaches to Structural Damage Identification: Model Updating versus Soft Computing", Journal of Intelligent Material Systems and Structures, Vol, 17, Jan. 2006, USA.

Lorenzo et al., "An Investigation into Hot-Spots in Two Large Grid-Connected PV Plants", progress in Photovoltaics: Research and Applications, Apr. 2008.

N. Moubayed et al., "A Comparison of Two MPPT Techniques for PV System," WSEAS Transactions on Environment & Development, Issue 12, vol. 5, Dec. 2009.

Park et al., "A Study on the Optimal Voltage for MPPT obtained by Surface Temperature of Solar Cell", The 30th Annual Conference of the IEEE, Nov. 2-6, 2004.

Rooij et al., "Advanced Reliability Improvement of Ac-Modules", Netherlands Energy Research Foundation ECN, Published Report, 1997-2000.

Sera et al., "Real-time Modelling, Diagnostics and Optimised MPPT for Residential PV systems", Aalborg University, Institute of Energy Technology, Denmark, Jan. 2009.

Stultz et al, "Fundamentals of Resonant Acoustic Modethod NOT", The Model Shop, Inc., 3149 East Kemper Road, Cincinnati, OH 45241.

T. Zhou, "Fabrication of Stable, Large-Area Thin-Film CdTe Photovoltaic Modules, Final Subcontract Report", National Renewable Energy Laboratory, 1617 Cole Blvd., Golden, CO. 80401. Jun. 1995.

Woyte et al., "Partial shadowing of photovoltaic arrays with different system configurations: literature review and field test results", Science Direct, Apr. 2003.

Zhai et al, "Detection of Crack Closure in Time-Resolved Acoustic Microscopy", IEEE 1051-0117/94/0000-1421, 1994.

International Search Report and Written Opinion issued in PCT Application No. PCT/US2012/021356, mailed on Aug. 9, 2012.

* cited by examiner

US 8,482,156 B2

THREE PHASE POWER GENERATION FROM A PLURALITY OF DIRECT CURRENT SOURCES

CROSS REFERENCE TO RELATED APPLICATIONS

This application is related to commonly-owned U.S. patent application Ser. No. 12/061,025 now U.S. Pat. No. 7,719,864 submitted Apr. 2, 2008 by Kernahan et al, hereinafter referred to as "the '864 patent", which application is incorporated herein in its entirety.

BACKGROUND

For many reasons, such as concerns for global warming caused by human activity, the increasing cost and potential eventual lack of availability of oil and natural gas, even the shortage of water for hydroelectric power, there is great interest in cost-effective methods and materials for providing energy. Much focus is brought to bear on renewable energy sources, especially upon electricity generated using photovoltaic panels. At the present time the widespread use and installation of electric capacity from solar equipment is hampered by many factors. Present solutions suffer from poor efficiency, short product lifetimes, a poor business model, and consumer resistance to a substantial up-front cost that may not be recovered if the consumer does not continue living in a facility equipped with solar equipment long enough to recoup the capital costs.

Efficiency, or lack of it, is primary in these problems. For example, referring to FIG. 1, the current state of the art provides a number of solar panels configured in a series arrangement, the power from the panels then converted from direct current to alternating current. However the efficiency of the sting of panels is dramatically degraded by diminished output by any one of the series-connected panels. Sources of diminished output range from bird droppings to shade or partial shade of a portion of the series of panels from overhanging trees.

FIG. 2 is an example of grid-connected photovoltaic systems, wherein the power provided by the solar system is driven into the grid system of a utility. A representative configuration of a system according to the prior art 202 shows a plurality of panels with a single inverter for converting the direct current provided by the panels in to alternating current electrical power. A representation of an example embodiment of the present invention is shown as system 204. Note that each panel of 204 includes an individual converter.

The '864 patent application discloses a two-phase system of power generation. Commercial power generators provide three phase high voltage electrical power to the power grid. What is needed is an array converter configured to provide three phase power from photovoltaic panels.

SUMMARY

In the two-phase system of the '864 patent application, two circuit branches are switched at certain times to provide energy stored in coils to two output terminals. The two output terminals are 180 degrees out of phase with respect to each other. In the present invention this notion is extended by providing steering logic such that coil energy is directed to two selected output terminals (one at a time), returning through a third terminal. The selection of terminals for sourcing and sinking current changes each sixty degrees. The process is completed at a frequency much higher than the grid frequency, thereby providing pulse amplitude modulated current into three load branches. At certain times the steering logic configures one of three output terminal pairs to provide positive current to the other two output terminal pairs. This is done in a two step process, each step dedicated to providing current to one branch from the common reference branch, then the other branch. A third time period then provides time for the coils to again charge up before they are discharged in the next cycle.

In some embodiments the steering logic comprises thyristors, which are slower than MOSFETs. To overcome this characteristic, a pulse extending filter technique is used.

DETAILED DESCRIPTION OF SOME EMBODIMENTS

Figure 1:
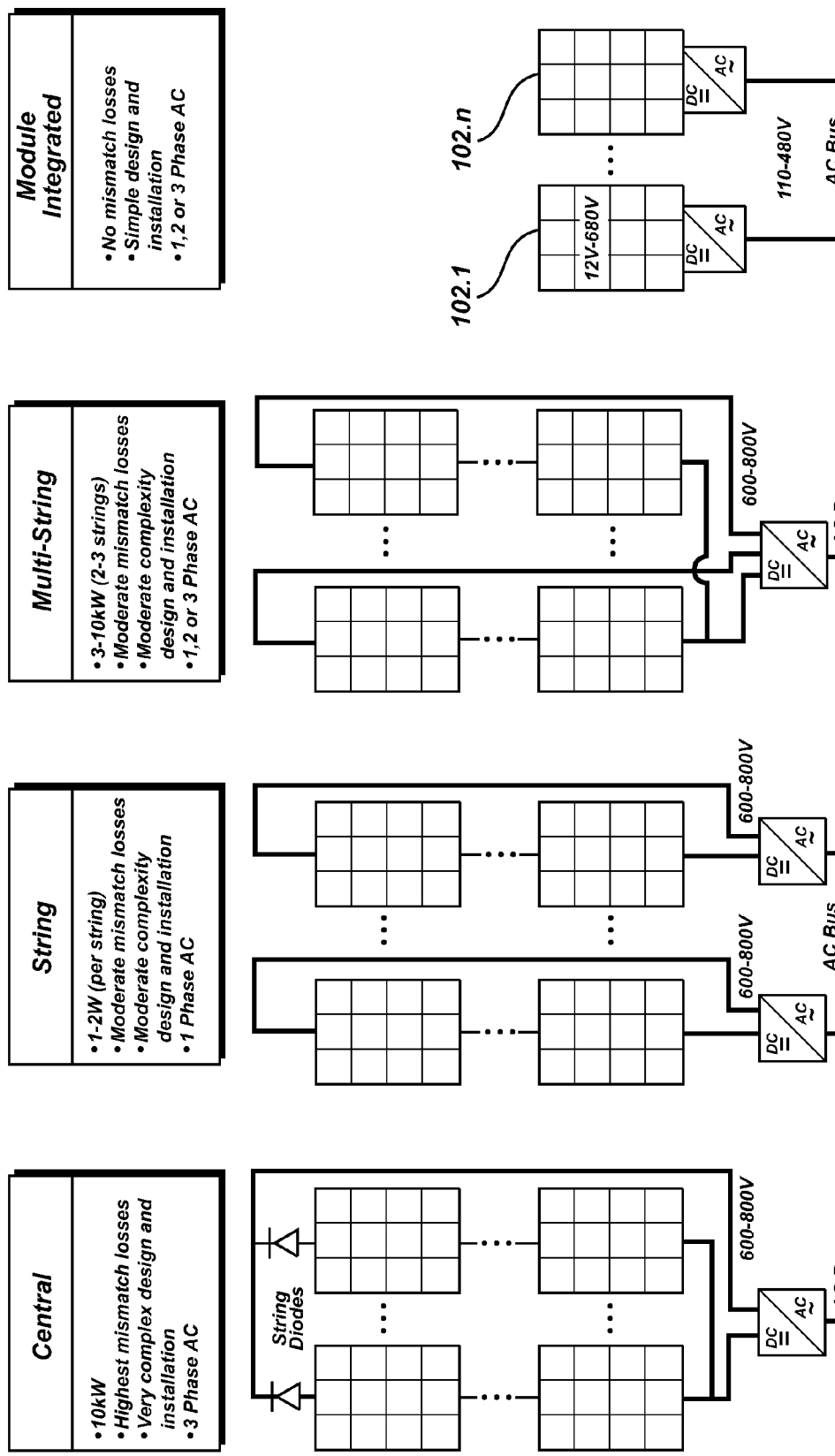
FIG. 1 shows examples of the prior art and a brief example of the present invention.

| | Definition of some terms: |
|---|---|
| Islanding | Operation of an on-premises power generating system that is normally connected to a grid which continues to operate when it is not connected to the grid. |
| Grid | AC power provided to a premises by an outside source, typically a utility company. |
| PV | Photovoltaic panel; another term for the commonly-used "solar panel" |
| cps | Abbreviation for "cycles per second"; the frequency of an AC power supply |
| AC | Abbreviation for "alternating current", though one may also view it as "alternating voltage" in that the polarity of the voltage provided alternates. |
| DC | Abbreviation for "direct current"; electrical power that is always provided in a given polarity. The voltage of the power source may or may not be fixed. |
| FET | Field effect transistor |
| MOV | Metal Oxide Varistor. Often used for over voltage protection of a circuit. |
| PAM | Pulse Amplitude Modulation. a form of signal modulation where the message information is encoded in the amplitude of a series of signal pulses. |
| PCM | Pulse Code Modulation. a digital representation of an analog signal where the magnitude of the signal is sampled regularly at uniform intervals, then quantized to a series of symbols in a digital (usually binary) code. |
| THD | Total Harmonic Distortion. A measure of noise on a signal. |

The present invention is suitable for power conversion from any direct current source to an arbitrary output signal configuration. Example of suitable direct current sources include batteries, wind turbines, geothermal, chemical, tidal and piezoelectric; any power source with a direct current output. Examples of output signal configurations include sinusoidal alternating current, direct current, trapezoidal, Gaussian, square wave, triangle wave, and adaptive. Adaptive signals include, for example, modifying the output waveforms on a cycle-by-cycle or other time period basis to adapt to, modify, or cancel the effect of transient noise or other conditions. Such signals may also include symbols superimposed on the base (carrier) signal as a method for communicating between modules, subsystems, or out of systems modes.

To more clearly understand the operation of the present invention we first describe the operation of a similar two-phase system. The operation of a three phase system according to the present invention then involves a different output stage. In a single phase system, a DC to pulse amplitude modulated ("PAM") current converter, denominated a "PAMCC" is connected to an individual solar panel ("PV"). A solar panel typically is comprised of a plurality, commonly seventy-two, individual solar cells connected in series, wherein each cell provides approximately 0.5 volt at some current, the current being a function of the intensity of light flux impinging upon the panel. The PAMCC receives direct current ("DC") from a PV and provides pulse amplitude modulated current at its output. The pulse amplitude modulated current pulses are typically discontinuous or close to discontinuous with each pulse going from near zero current to the modulated current and returning to near zero between each pulse. The pulses are produced at a high frequency relative to the signal modulated on a sequence of pulses. The signal modulated onto a sequence of pulses may represent portions of a lower frequency sine wave or other lower frequency waveform, including DC. When the PAMCC's output is connected in parallel with the outputs of similar PAMCCs an array of PAMCCs is formed, wherein the output pulses of the PAMCCs are out of phase with respect to each other. An array of PAMCCs form a distributed multiphase inverter whose combined output is the demodulated sum of the current pulse amplitude modulated by each PAMCC. If the signal modulated onto the series of discontinuous or near discontinuous pulses produced by each PAMCC was an AC current sine wave, then a demodulated, continuous AC current waveform is produced by the array of PAMCCs. This AC current waveform is suitable for use by both the "load", meaning the premises that is powered or partially power by the system, and suitable for connection to a grid. For example, in some embodiments an array of a plurality of PV-plus-PAMCC modules are connected together to nominally provide a split-phase, Edison system 60 cps 240 volt AC to a home.

Before discussing an array comprising a plurality of PV-plus-PAMCC modules, we first look at an individual PAMCC. For example, referring to FIG. 4, a PV panel is electronically represented by the diodes and capacitor shown as reference numeral 401. Collectively the components comprising an PAMCC (or sometimes "micro inverter") are referred to as simply "the PAMCC 400." Current is provided by the PV 401 to a positive input terminal 402 and a negative input terminal 404. The positive input terminal 402 is connected in series with a coil L1 406. The negative input terminal 404 is connected in series with a coil L2 405. In some embodiments (not shown) coils L1 406 and L2 405 comprise a one-to-one transformer with two input and two output terminals, wherein the two coils are magnetically coupled, thereby providing essentially the same current in both paths, which may be advantageous for a single-phase system. In the exemplary embodiment for a three-phase system, coils 406 and 405 are independent of each other, i.e., no magnetic coupling. This arrangement improves efficiency in a three-phase system, in that within any given switching cycle the power delivered by each coil is approximately equal to the power delivered by the other coil, but only at certain points in a cycle is the voltage across the two coils 405, 406 equal. Hereinafter we refer to the coil pair of L1 406 and L2 405 collectively as "T1" 407. A switch Q1 404, for example an NMOS FET, is connected across the load side of the transformer 407, with the source of Q1 404 connected in parallel to the negative terminal of the T1 407 output. Note that the negative sides of the PV 401 and of the PAMCC 400 are floating; that is, they are not grounded. A controller 412 has an output terminal 414 which provides a signal to the control gate (Q1G) of Q1 404 on a line 411. In some embodiments the controller 412 is a microprocessor with additional logic and is operated by a program. The controller 412 is discussed in more detail hereinafter.

The controller 412 comprises a plurality of output terminals, each operated independently. Four controller 412 output terminals 415 through 418 are connected to the control terminals of four triacs (CR11 424; CR22 423; CR12 425; and CR21 426 respectively) by four lines 119 through 422 respectively (inner-connections not shown). Each line, therefore each triac, is independently controlled by control signals from the controller 412. The anode terminals of CR11 424 and CR22 423 are connected in parallel to the positive output terminal of T1 407. The cathode terminals of triacs CR12 425 and CR21 426 are connected in parallel to the negative output terminal of T1 407. The cathode terminal of triac CR11 424 and the anode terminal of triac CR12 425 are connected in parallel to a coil L12 430. The cathode terminal of triac CR22 423 and the anode terminal of triac CR21 426 are connected in parallel to a coil L22 431. A terminal 434 from coil L12 430 is arbitrarily designated as providing a "phase 1" (P1) output and a terminal 436 from coil L22 431 is arbitrarily designated as providing a "phase 2" (P2) output. In some embodiments the coils L12 430 and L22 431 are embodied in a one-to-one transformer. In the embodiment exemplified in FIG. 4 coils L12 430 and L22 136 are separate coils. A capacitor C12 438 is across the input side of coil L12 430 and a neutral output terminal 432. Another capacitor C22 is across the input side of coil L22 431 and the neutral output terminal 432. In another embodiment there is no neutral output terminal 432 and there is a single capacitor across the input terminals of coil L12 430 and L22 431; in this embodiment the voltage rating of the capacitor is at least twice that of capacitors C22 440 and C12 438.

Operation of the system is implemented by control signals on lines 411 and 419 through 422. In particular the control signal Q1G on line 411 and signals CR11T on line 419; CR22T on line 420; CR12T on line 421; and CR21T on line 422 connect and disconnect the current provided by PV 401 in a sequence within the PAMCC 400 with a high-frequency period, for example 30 KHz, which provides a PCM signal which is modulated by a slower, 60 cycle pattern, thereby providing an output whose amplitude is a PAM signal approximating a sine wave.

Figure 2:
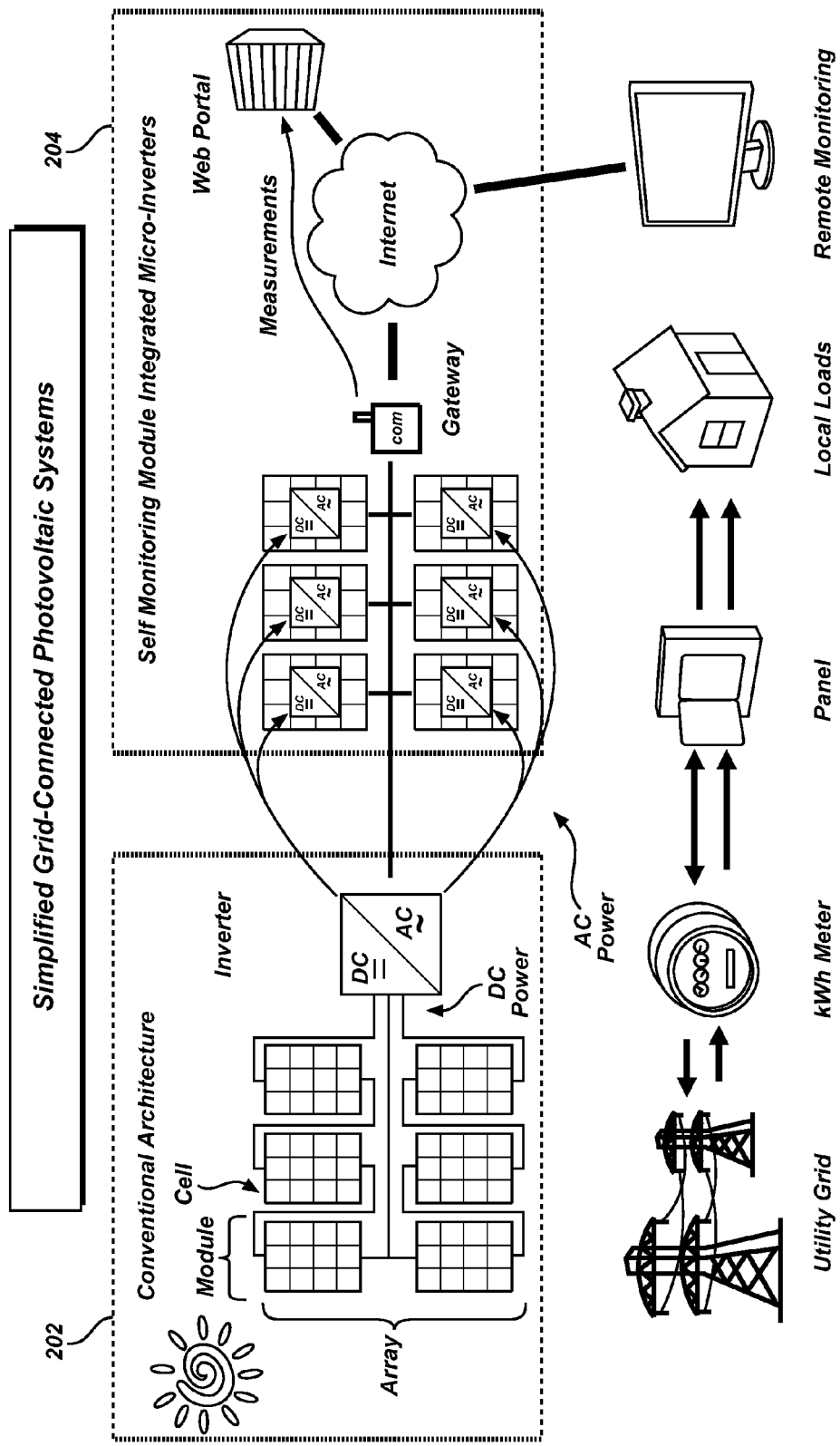
FIG. 2 is an example of grid-connected photovoltaic systems.
Figure 3:
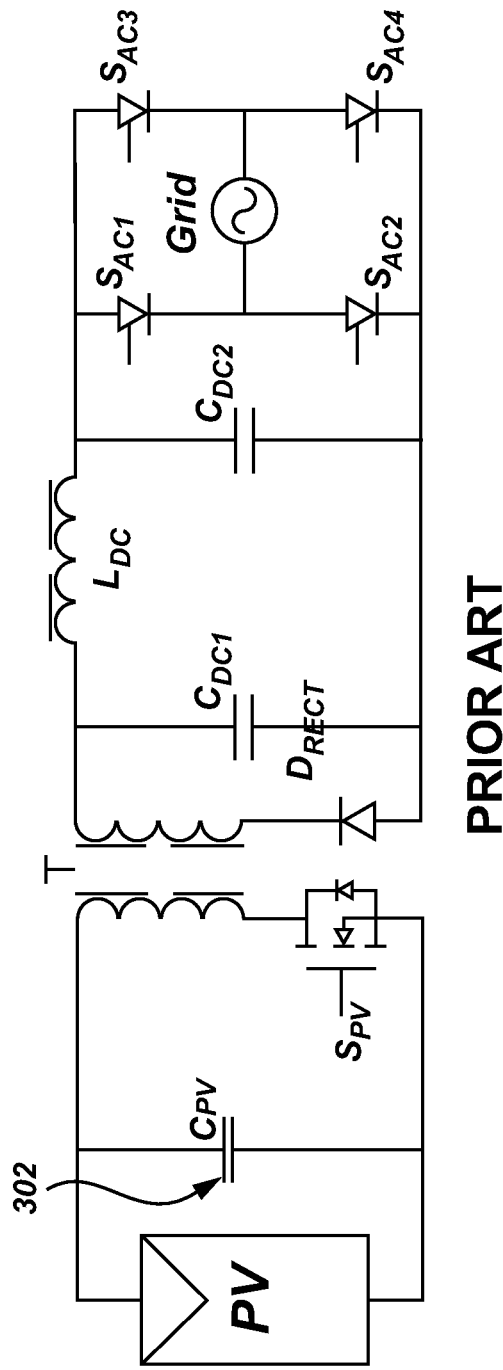
FIG. 3 is an example of the current art. PRIOR ART.

Referring to FIG. 2, the initial conditions are as follows: Q1 404, CR11 424, CR22 423, CR12 425 and CR21 426 de-energized; coils L1 406, L2 405, L12 430 and L22 431 empty of current; and photovoltaic cells PV1 through PVn dark. In this condition the grid AC voltage is applied between P1 434 and P2 436 and experiences a path through L12 430, C12 438, C22 440 and L22 431. The resonate frequency selected for a reconstruction filter comprising L12 430 and C12 438 is typically chosen to be about one half the switching frequency of Q1 404. The resonate frequency of a reconstruction filter comprising L22 431 and C22 440 is chosen to be the same as the reconstruction filter of L12 430 and C12 438. In one embodiment the transistor Q1 404 is selected for a specified switching frequency of approximately 30 kHz and the resonate frequency of the reconstruction filters are then designed for 15 kHz. With the grid AC voltage typically being 60 Hz, an unimportant amount of capacitive reactive load is presented to the grid.

Circuit operation begins with the solar panel 401 being exposed to sufficient light to produce significant current. The presence of the current may be observed as an increase in voltage across Q1 404. At this point Q1 404 is initially turned on by applying a signal from controller 412 on line 411 between Q1G and Q1S. The interface between the controller 412 and the transistor Q1 404 may be optically isolated, transformer coupled, or the controller 412 may be connected to Q1S. In this state L1 406 and L2 405 begin to charge with current. When the voltage across PV 401 falls to a predetermined value, the time to charge the coils is noted in order to calculate the current and standard operation begins with the next grid zero crossing. In one embodiment this is when the voltage at P1 crosses above P2 while P1 is going positive and P2 is going negative. At this point signals CR11T 419 and CR21T 421 are asserted such that CR11 424 and CR21 426 will conduct when current are applied to them.

Case 1: PWM Modulation for Positive Half Wave of the Grid

Figure 4:
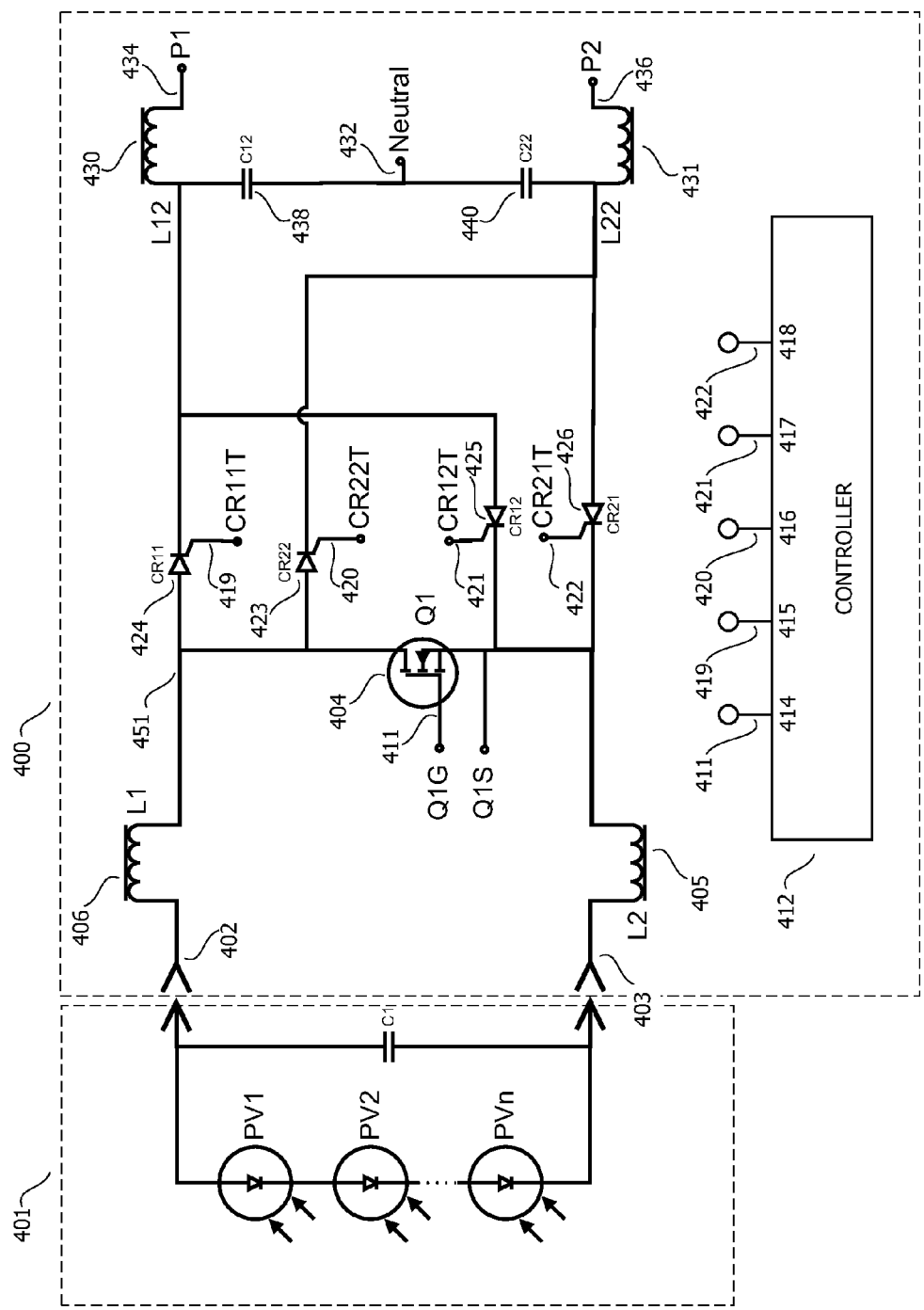
FIG. 4 is an example of a single pulse amplitude modulated current converter according to the present invention.
Figure 5:
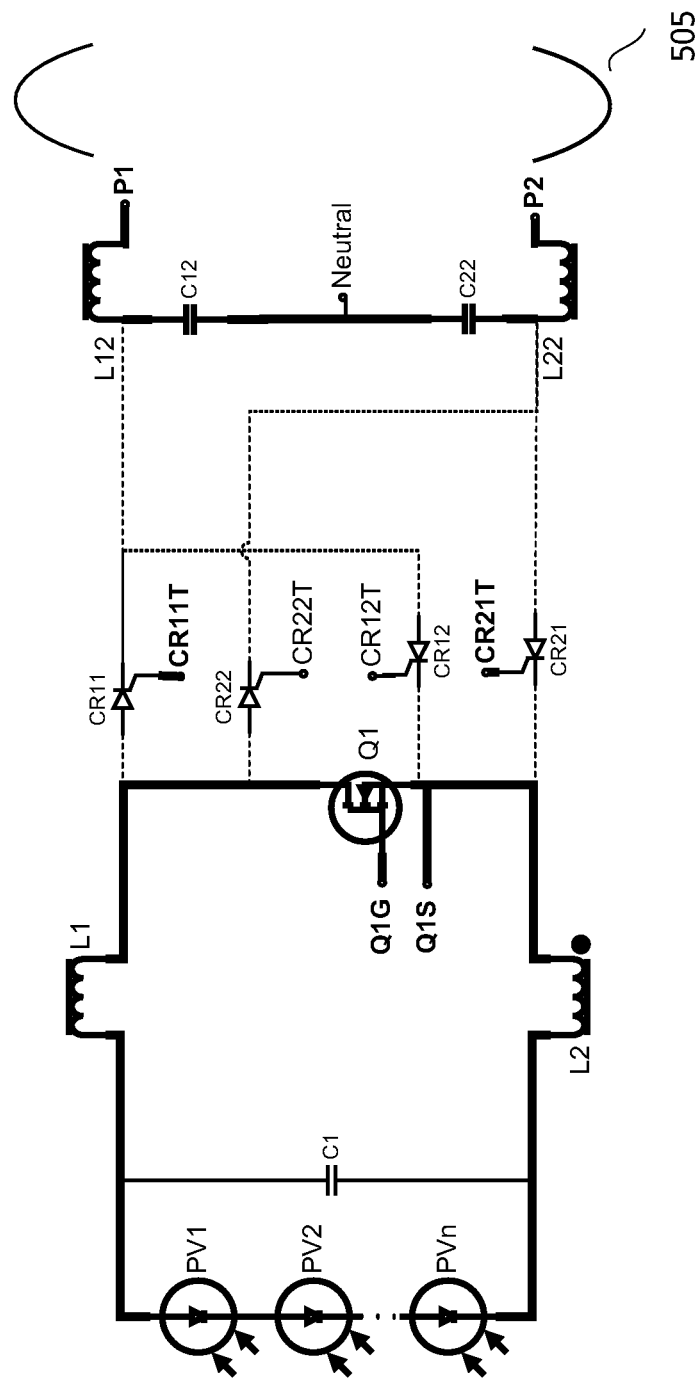
FIG. 5 shows a pulse amplitude modulated current converter with a transistor completing the circuit to charge inductors while reconstruction filters produce current pulses for the gird positive half phase.

FIG. 5 through FIG. 8 will be referred to in describing the operation of PAMCC 400. Note that the components correspond to those of FIG. 4, but the reference numbers have been left off so as not to obscure the description. However we refer to the reference numbers provided by FIG>4. Looking to FIG. 5, with L1 406 and L2 405 charged, Q1 404 is turned off for a pulse width modulated time. After the off time has expired, Q1 404 is turned on until the end of the current switching cycle. During the time that Q1 404 is off, current previously stored in L1 406 and L2 405, together with the current flowing in PV 401, is applied to the input terminals of CR11 424 and CR21 426, which remain enabled as a result of the signals CR11T 419 and CR21T 421 for the entire positive half cycle of the grid. The positive half cycle of the grid is defined as the condition wherein the voltage at output terminal P1 434 is greater than the voltage at output terminal P2 436. The charge in the current pulse delivered through the triac CR11 424 is initially stored on capacitor C12 438, creating a voltage more positive on the near end of coil L12 430 relative to the end of coil L12 which is connected to the output terminal P1 434. The charge in the current pulse delivered through triac CR21 426 is initially stored on capacitor C22 440, a voltage more negative on the near end of coil L22 431 relative to the end of coil L22 which is connected to the output terminal P2 436. This is the initial condition for both the reconstruction filter comprising L12 430, C12 438 and the reconstruction filter comprising L22 431, C22 440. At this point the reconstruction filters will transform the pulse width modulated current pulse delivered to them to a pulse amplitude modulated (PAM) half sine wave of current 505 delivered to the grid as shown in FIG. 5.

The resonate frequency for the reconstruction filters are chosen to be about one half the switching frequency of Q1 404 so that one half of a sine wave of current will be provided to P1 434 and P2 436 for each pulse width modulated current pulse delivered to them. Since the resonate frequency of each reconstruction filter is independent of the pulse width of current applied to it, and the charge in the instant current pulse applied to the reconstruction filter must be equal to the charge in the half sine wave of current delivered out of the reconstruction filter to the grid, changes in the pulse width of input current will be reflected as changes in the amplitude of the output of the reconstruction filters. As the current in the inductors in the reconstruction filters returns to zero, the next pulse of current is delivered to the capacitors of the reconstruction filters because the frequency of the reconstruction filters is one half the rate at which pulse width modulated current pulses are produced by Q1 404.

The off time of Q1 404 is modulated such that the width of current pulses produced is in the shape of the grid sine wave. The reconstruction filters transform this sequence of pulse width modulated current pulses into a sequence of pulse amplitude modulated current pulses whose amplitude follows corresponding points of the shape of the grid sine wave.

So long as the grid half cycle remains positive at the terminal P1 434 relative to the output of terminal P2 436, further current pulses are produced by repeating the process described hereinbefore, beginning at "CASE 1: PWM modulation for positive half wave of the grid".

The negative zero crossing of the grid voltage is defined as the condition wherein the voltage at terminal P1 434 is equal to the voltage at terminal P2 436 after P1 434 has been more positive than P2 436. Prior to the negative zero crossing, Q1 404 is turned on, thereby removing current from CR11 424 and CR21 426. At this point the signals CR11T 419 and CR21T 421 are de-asserted, preventing triacs CR11 424 and CR21 426 from conducting current during the grid negative half cycle. After the negative zero crossing, with the voltage of terminal P1 434 more negative than the voltage of terminal P2 436, the signals CR22T 420 and CR12T 421 are then asserted, enabling CR22 423 and CR12 425 to conduct when current is applied to them.

Case 2: PWM Modulation for Negative Half Wave of Grid

Figure 6:
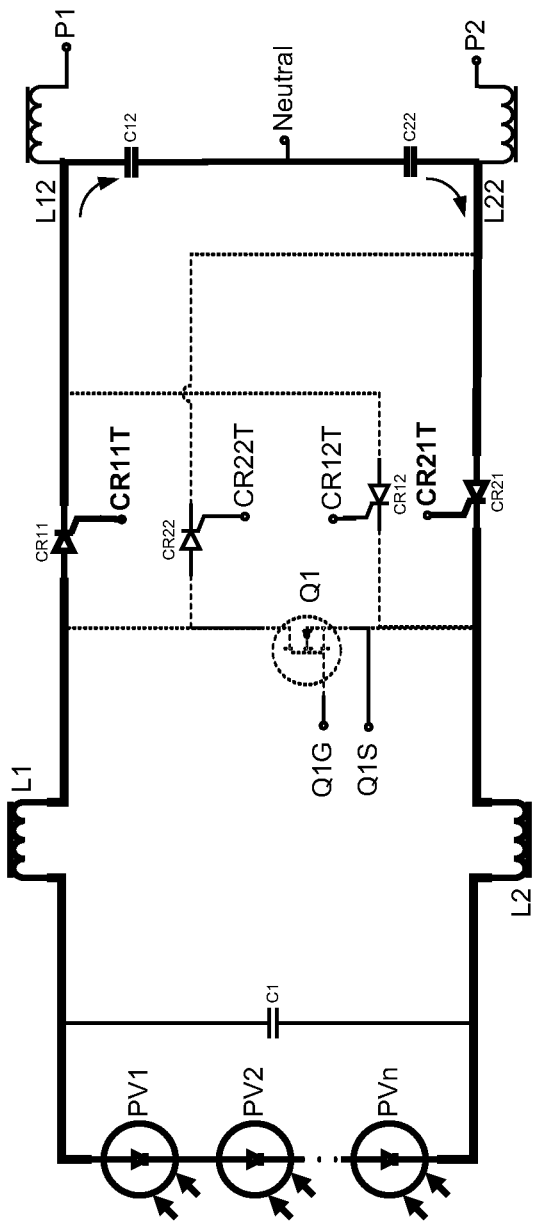
FIG. 6 shows a pulse amplitude modulated current converter with current flowing through into the reconstruction filters for the gird positive half phase.
Figure 7:
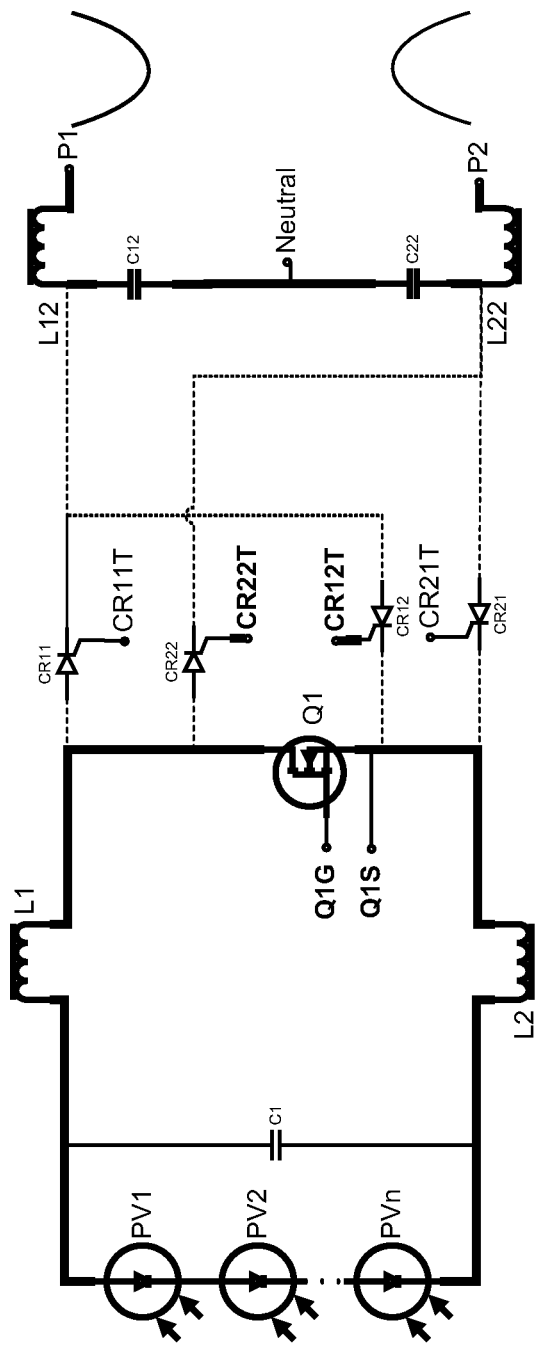
FIG. 7 shows a pulse amplitude modulated current converter with a transistor completing the circuit to charge inductors while reconstruction filters produce current pulses for the gird negative half phase.
Figure 8:
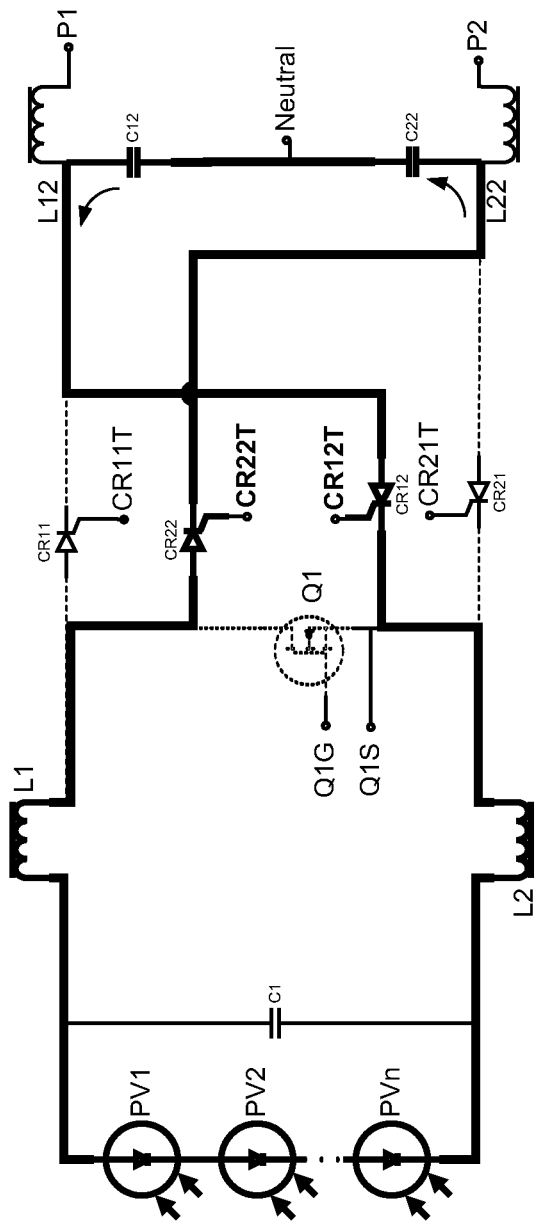
FIG. 8 shows a pulse amplitude modulated current converter with current flowing through into the reconstruction filters for the gird negative half phase.

Referring to FIG. 6, with L1 406 and L2 405 charged Q1, 404 is turned off for a pulse width modulated time. After the off time has expired, Q1 404 is turned on until the end of the instant current switching cycle. During the time that Q1 404 is off, current previously stored in L1 406 and L2 405 together with the current flowing in PV 401 is applied to the input terminals of CR12 425 and CR22 423 which remain enabled by signals CR22T 420 and CR12T 421 for the entire negative half cycle of the grid. The negative half cycle of the grid is defined as the condition wherein the voltage at terminal P1 434 is greater than the voltage at terminal P2 436. The charge in the current pulse delivered through the triac CR22 423 is initially stored on capacitor C22 440, creating a voltage more positive on the near end of coil L22 431 relative to the end connected to terminal P2 436. The charge in the current pulse delivered through CR12 425 is initially stored on C12, a voltage more positive on the near end of coil L12 430 relative to the end connected to terminal P1 434. This is the initial condition for both reconstruction filter comprising L12 430, C12 438 and reconstruction filter comprising L22 431, C22 440. At this point the reconstruction filters will transform the pulse width modulated current pulse delivered to them to a pulse amplitude modulated half sine wave of current delivered to the grid as shown in FIG. 4.

The reconstruction filters for Case 2 are the same components as described in association with Case 1; their design and operation are not repeated here.

The off time of Q1 404 is modulated such that the width of current pulses produced is in the shape of the grid sine wave. The reconstruction filters transform this sequence of pulse width modulated current pulses into a sequence of pulse amplitude modulated current pulses whose amplitude follow corresponding points of the shape of the grid sine wave.

So long as the grid half cycle remains negative, with the voltage of terminal P1 434 more negative than the voltage of terminal P2 436, further current pulses are produced by repeating the process described hereinbefore, beginning at "CASE 2: PWM modulation for negative half wave of grid."

The positive zero crossing of the grid voltage is defined as the condition wherein the voltage at terminal P1 434 is equal to P2 436 after the voltage at terminal P1 434 has been more negative than the voltage of terminal P2 436. Prior to the positive zero crossing, Q1 404 is turned on, removing current from triacs CR12 425 and CR22 423. At this point the signals CR12T 421 and CR22T 420 are de-asserted, preventing triacs CR12 425 and CR22 423 from conducting current during the grid positive half cycle. After the positive zero crossing with P1 434 more positive than P2 436, signals CR11T 419 and CR21T 421 are asserted, enabling triacs CR11 424 and CR21 426 to conduct when current is applied to them.

With the grid again positive, the process would again return to the process described hereinbefore, beginning with the section labeled CASE 1: PWM modulation for positive half wave of the grid.

Figure 9:
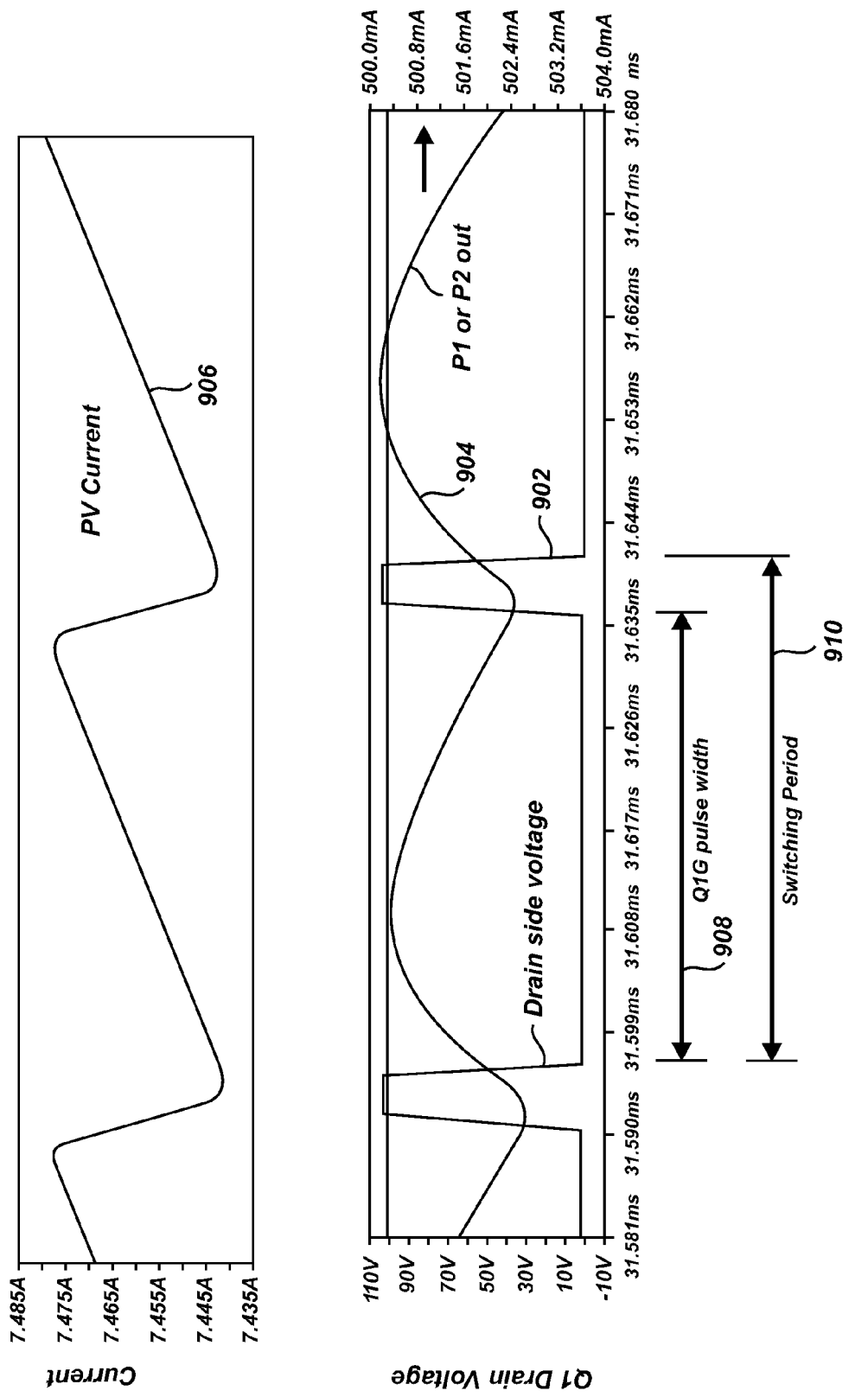
FIG. 9 relates the timing of drive signals and current.

FIG. 9 shows a signal diagram of the results of the conversion of a pulse width modulated pulse, translated into a pulse amplitude modulated (PAM) current pulse by a reconstruction filter, such as those previously disclosed hereinbefore (L12 430 and C12 438; L22 431 and C22 440). The short duration roughly rectangular voltage pulses 902 are the voltage on the drain side 451 (FIG. 4) of Q1 404. The pulse width labeled 908 approximates the pulse width of the signal Q1G on line 411 (FIG. 4) and the period 910 is the switching period of the PAMCC 400. This voltage drives the transformer 407 and PV 401 currents through a triac CR11 424 or CR12 425 (depending upon the instant status of the control signals from controller 412, as previously described) into the input of one of the reconstruction filters. The rounded half wave rectified sine wave 904 is the output of the reconstruction filter. As the pulse width 908 (approximately) of the input pulse increases, the amplitude of the output wave form 904 increases. The triangular wave form 906 at the top of the graphs plots the variation of current through PV 401 during the common window of time. Trace 906 shows the effect of transformer 407 in maintaining a relatively constant PV 401 current, independent of the relatively large pulse width modulated current pulses provided to the reconstruction filters.

Figure 10:
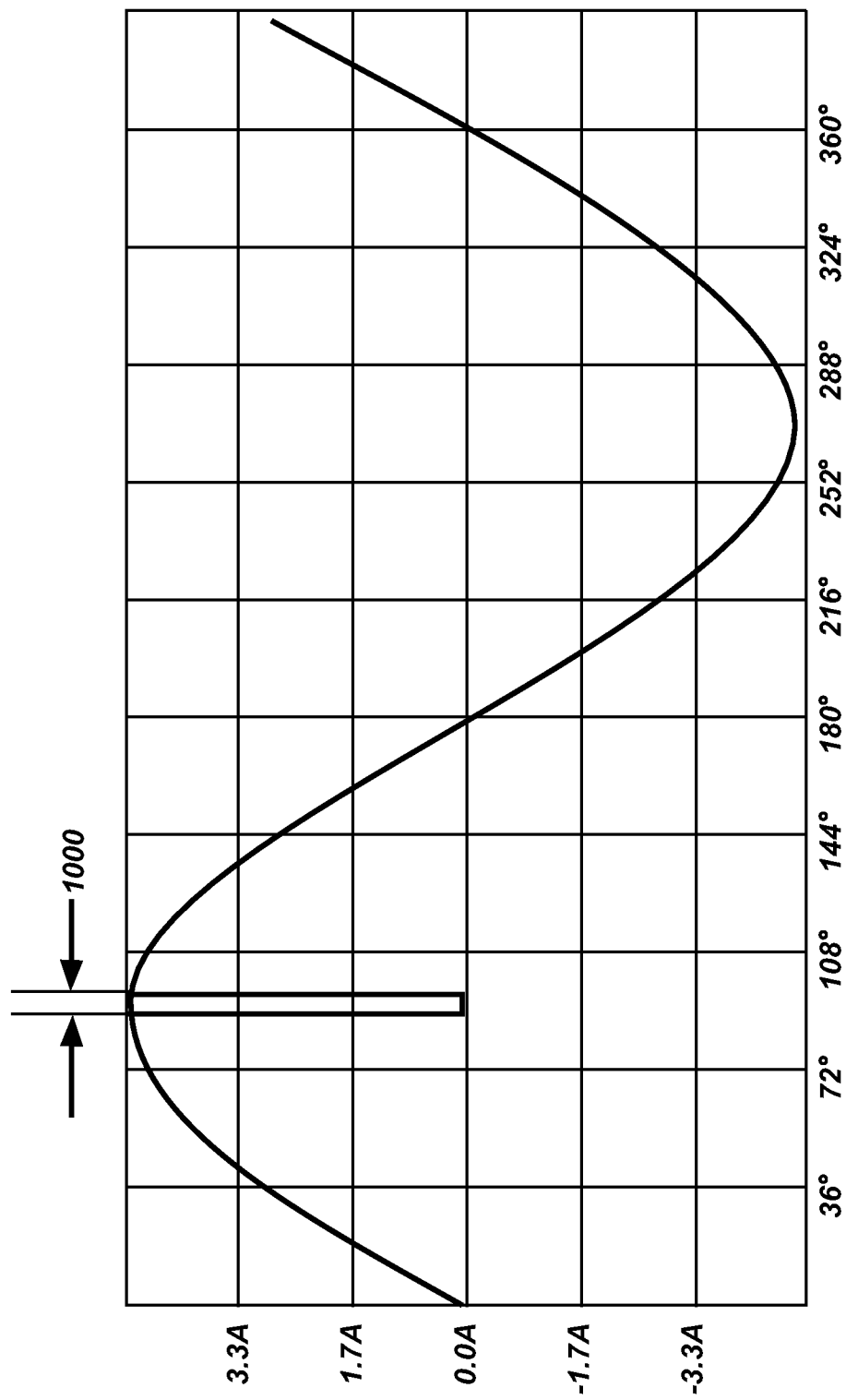
FIG. 10 shows what portion of current in a sine wave of current will be examined in detail in some following drawings.
Figure 11:
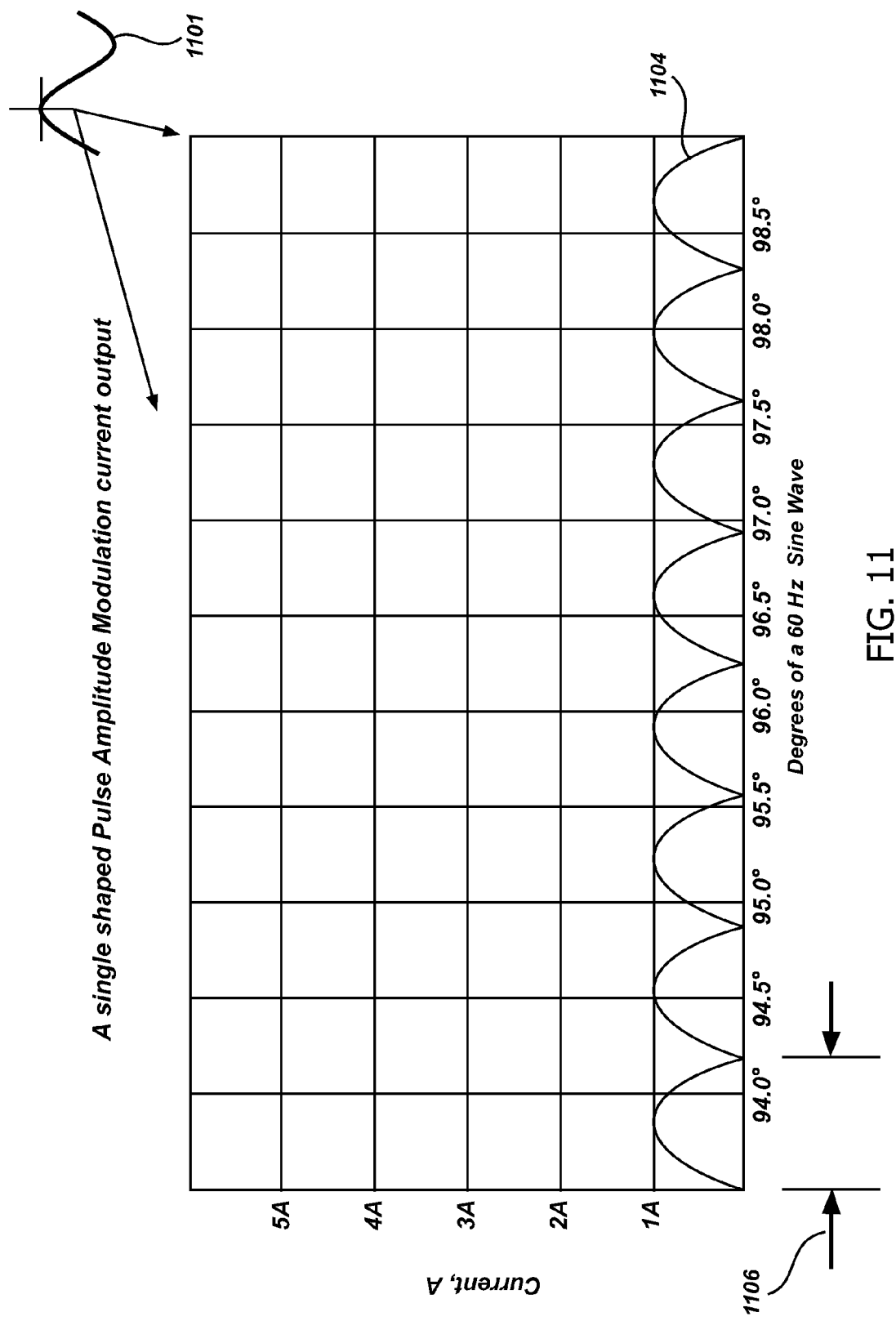
FIG. 11 shows the pulses provided by a single pulse amplitude modulated current converter.
Figure 12:
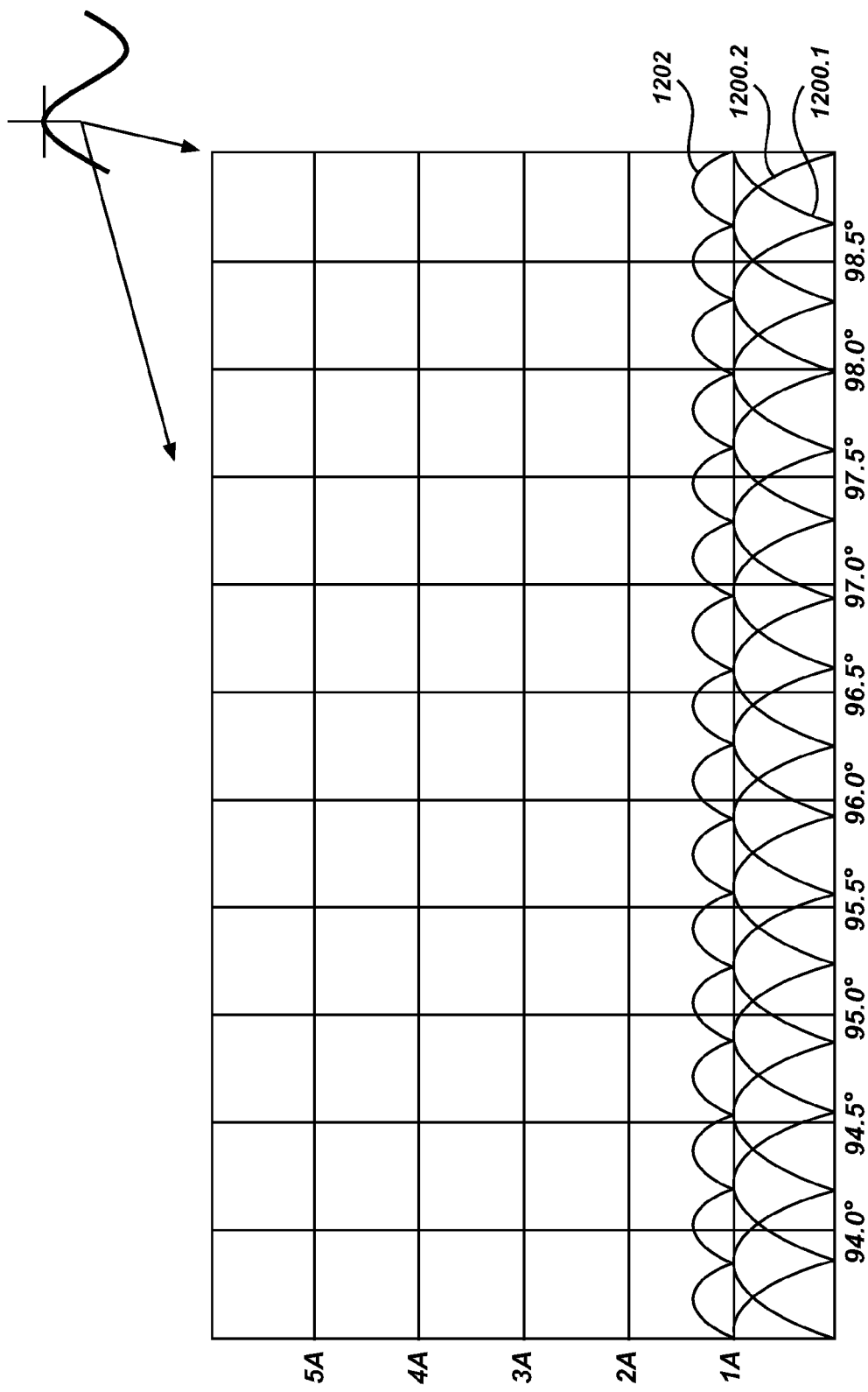
FIG. 12 shows the pulses provided by two pulse amplitude modulated current converters and their total, summed current.
Figure 13:
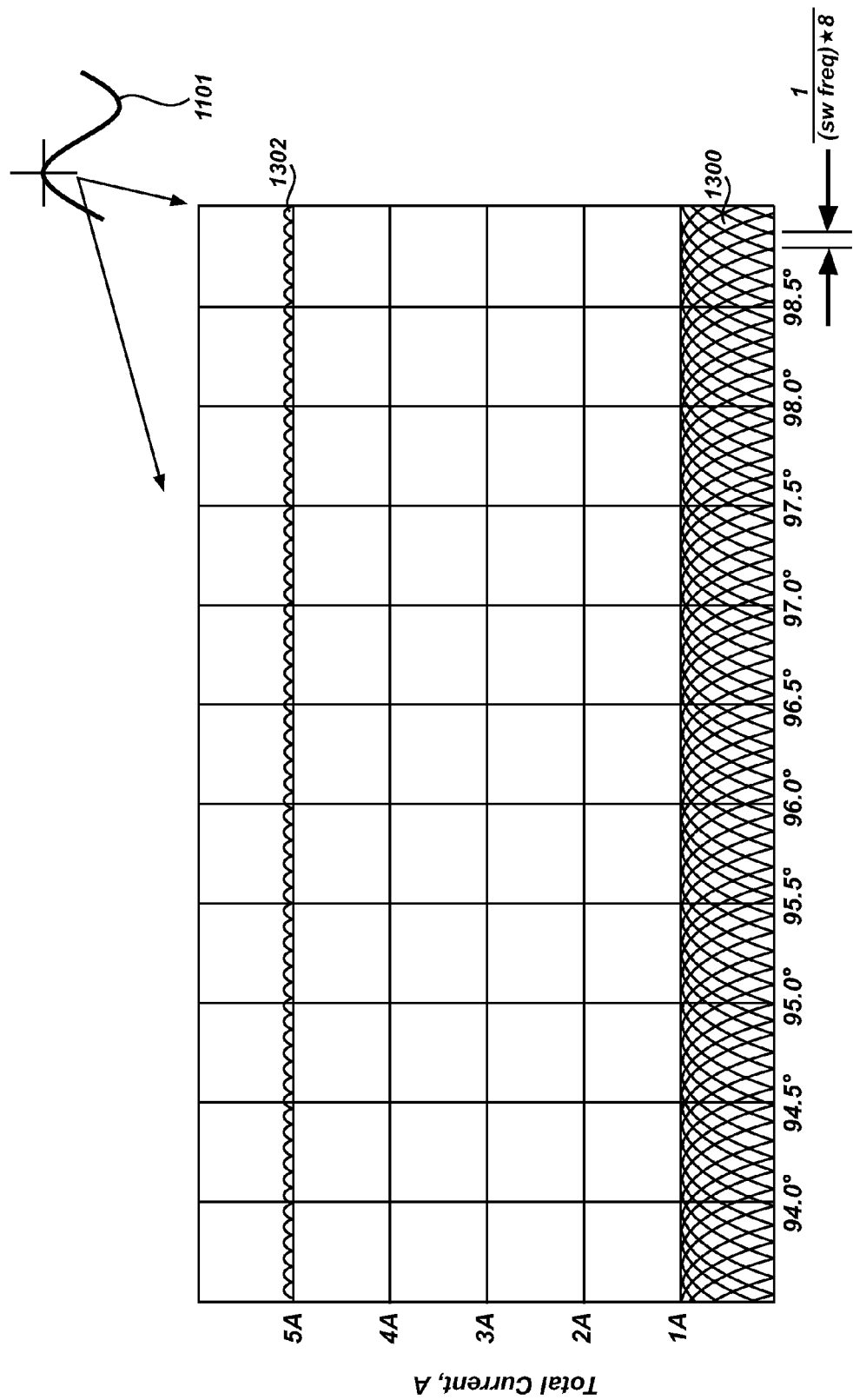
FIG. 13 shows the pulses provided by eight pulse amplitude modulated current converters and their total, summed current.

FIG. 10 indicates the narrow time slice of a grid sine wave cycle to be depicted in FIGS. 11, 12 and 13.

FIG. 11 shows the pulse amplitude modulated output current of a single PAMCC 400. Note that the amplitude shown is for a small portion of time near the positive peak of the grid voltage as indicated on the cycle example 1101. The individual pulses 1104 have a period 1106 equal to the period of the switching frequency, for example (1/30 KHz).

In FIG. 12, two individual currents (1200.1 and 1200.2) of two PAMCCs (each in accordance with the PAMCC 400) are phased apart one half of the period of the switching frequency. The trace 1202 above is the sum of the two PAMCC output currents 1200.1 and 1200.2. Note that the summed current 1202 has a much smaller ripple than the ripple of a single PAMCC (see FIG. 11) and has twice the ripple frequency as of the ripple frequency of a single inverter. The summed current 1202 does not return to zero.

Following on the summation of the currents of two PAMCC 400 outputs, FIG. 13 shows the individual output currents of eight PAMCCs (the line 1300 is representative; each waveform is not numbered), each phased evenly across the period of the switching frequency. For example for a system using a 30 KHz switching frequency, the period is 33.3 microseconds and each phase is delayed by (33.3/8), or 4.167 microseconds, relative to the previous output current waveform. Any number of PAMCCs 400 may be so summed. As the number summed increases they are each phase delayed by a smaller number (1/(switching frequency)*n) where "n" is the number of PAMCCs summed. Note that the summed current shown in FIG. 13 has only a fraction of the ripple current of an individual PAMCC (FIG. 12) and has eight times the ripple frequency of that of an individual PAMCC. If each PAMCC 400 is producing a point on a grid sine wave with its sequence of PAM current pulses, phasing and summing a set of PAMCCs, forming an array of converters, will effectively demodulate a grid sine wave of current with very high accuracy and very low noise (ripple). Any number of array converters may be phased and summed in this way. As the number of PAMCCs is increased, the ripple amplitude decreases and the ripple frequency increases. In one embodiment two or more of the plurality of PAMCC 400 individual output currents are in phase with each other. In some embodiments the switching frequency is selected so as to be unrelated to the grid frequency, for example 60 Hz in the United States, so that the ripple will not represent harmonic distortion. Signals modulated onto the PAMCC output are arbitrary. In some embodiments multiple signals are modulated onto the PAMCC output, wherein one of such signals may, for example, provide for communication between an arbitrary two or more PAMCC modules. The PAMCC modulation is sometimes used to correct for distortion in the grid signal.

One of several ways to choose the phasing of the arrayed PAMCCs 400 is for each PAMCC 400 to be pre-assigned a timing slot number, with the first slot being scheduled following a zero crossing and each PAMCC 400 firing its PAM signal in the predetermined (i.e., assigned) sequence. In some embodiments, especially where the number of PVs is large, the phase relationship of individual PAMCCs is not controlled, in that they will naturally be phase separated across a cycle without deterministic phase scheduling.

Figure 14:
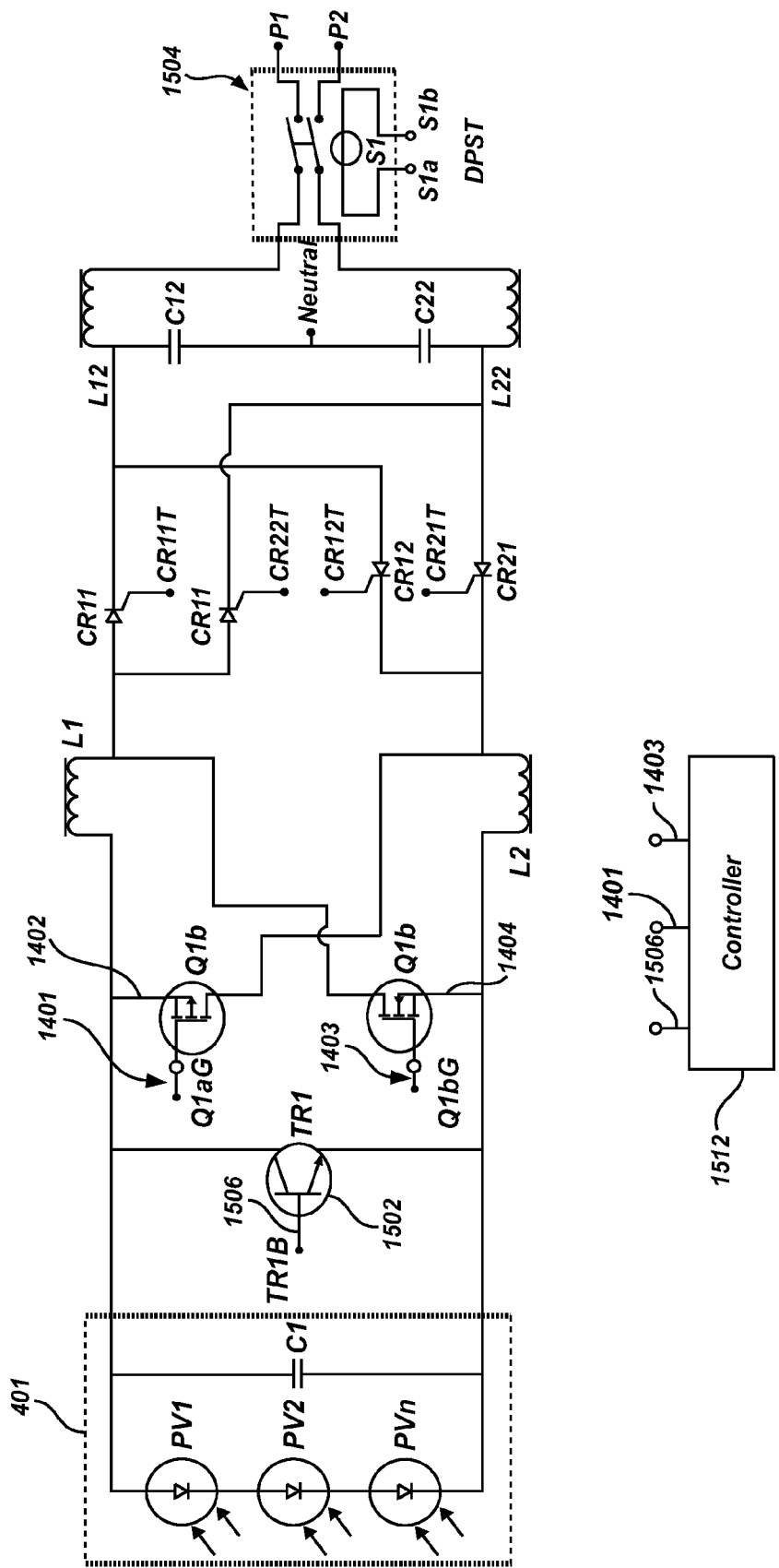
FIG. 14 shows an alternative circuit for a single pulse amplitude modulated current converter.

In an alternative embodiment, exemplified in FIG. 14, a second transistor is added, wherein Q1A 1402 and Q1B 1404 replace the single transistor Q1 404 as was shown and described in the circuit of FIG. 4. Using the two transistors Q1A 1402 and Q1B 1404 provides some potential advantages, including reducing the voltage across each transistor, allowing a more relaxed Rds_on (the "on" resistance) requirement for each transistor compared to the Rds_on requirement of Q1 404, and allowing each transistor to be driven with respect to the relatively low voltage and stable anode and cathode ends of PV 401. In this configuration, Q1A 1402 and Q1B 1404 are both turned on and off at the same times as with Q1 404 in the previous discussion. All other aspects of the circuit operation remain the same. Q1A 1402 and Q1B 1404 are of different transistor types, so separate signals to their control gates are provided by the control 1412. Controller 1412 is otherwise the same as controller 412 of FIG. 12, with the addition of output terminals connected to the control gates of Q1A 1402 and Q1B 1404 via lines 1401 and 1403 respectively.

Figure 15:
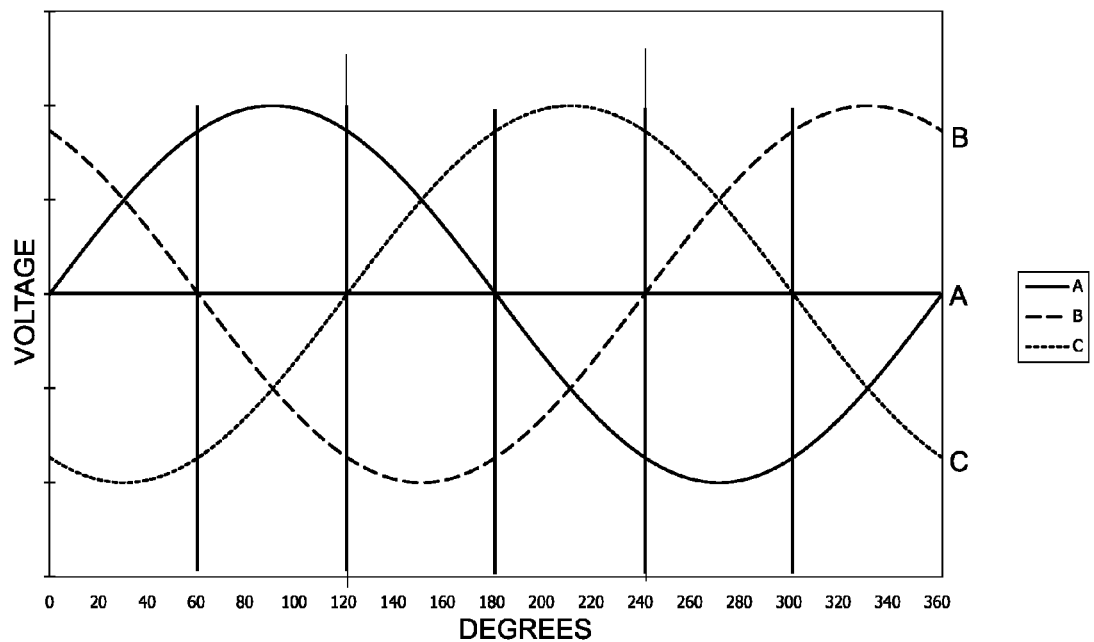
FIG. 15 defines the basic phase relationships in a three phase electrical system.

FIG. 15 illustrates the phase relationship between the phases of a three phase system. This and the following graphs indicate a vertical axis representing voltage, but for a fixed voltage system the axis would also represent current. We arbitrarily designate the three phases as A,B,C. Three phase circuits are configured in a "wye" arrangement or a "delta" arrangement, which is well known in the art. In a wye circuit, we refer to the common node as "N". As can be seen, the phases are 120 degrees apart. Note that in any given sixty degree window two phases will be of the same polarity and the third phase will be the opposite polarity.

For a commercial power generator, the generation system is connected to a low impedance three phase grid, wherein the power (therefore, the voltage-current product) are kept the same. So for a system according to the present invention the power in each of the three phases is equal.

Figure 16:
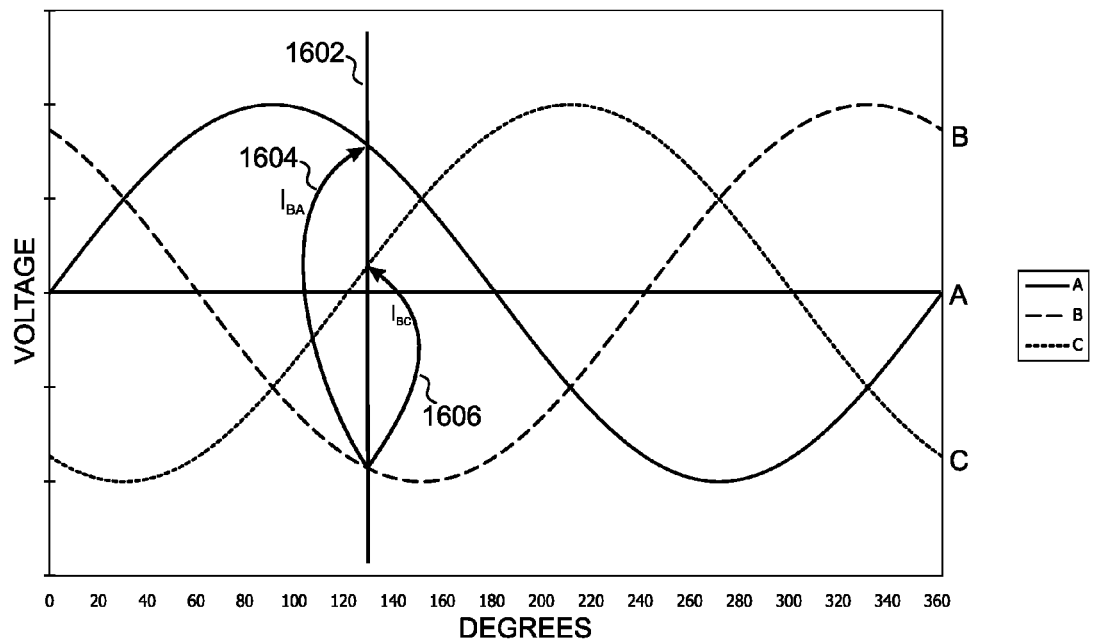
FIG. 16 is an example of a most negative voltage phase providing current to two other phases according to the method of the present invention.

In a system according to the present invention, current is always driven from a common reference of a given polarity to two terminals of the opposite polarity. Looking to FIG. 16, at a point in time of a grid cycle 1602, Vb is a negative voltage and Va, Vc are both positive voltages. To maintain the desired voltages on phases A and B, current Iba 1604 is driven from Phase B to Phase A, then current Ibc 1606 is driven from Phase B to Phase C. Note that positive current is being driven into positive voltage nodes, therefore the power delivered is positive.

Figure 17:
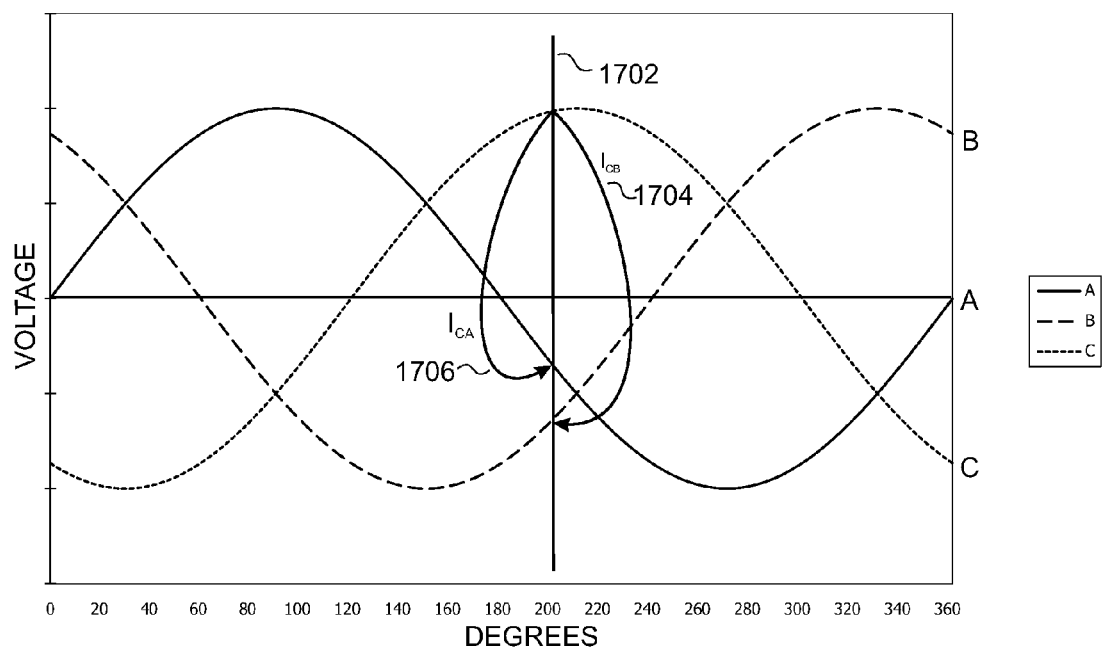
FIG. 17 is an example of a most positive voltage phase providing current to two other phases according to the method of the present invention.

Now looking to FIG. 17, at time 1702 Phase C is a positive voltage and Phases A and B are negative voltages. We therefore select Phase C as the common reference, and drive current Icb 1704 from Phase C to Phase B, then drive current Icb 1706 from Phase C to Phase A.

Figure 18:
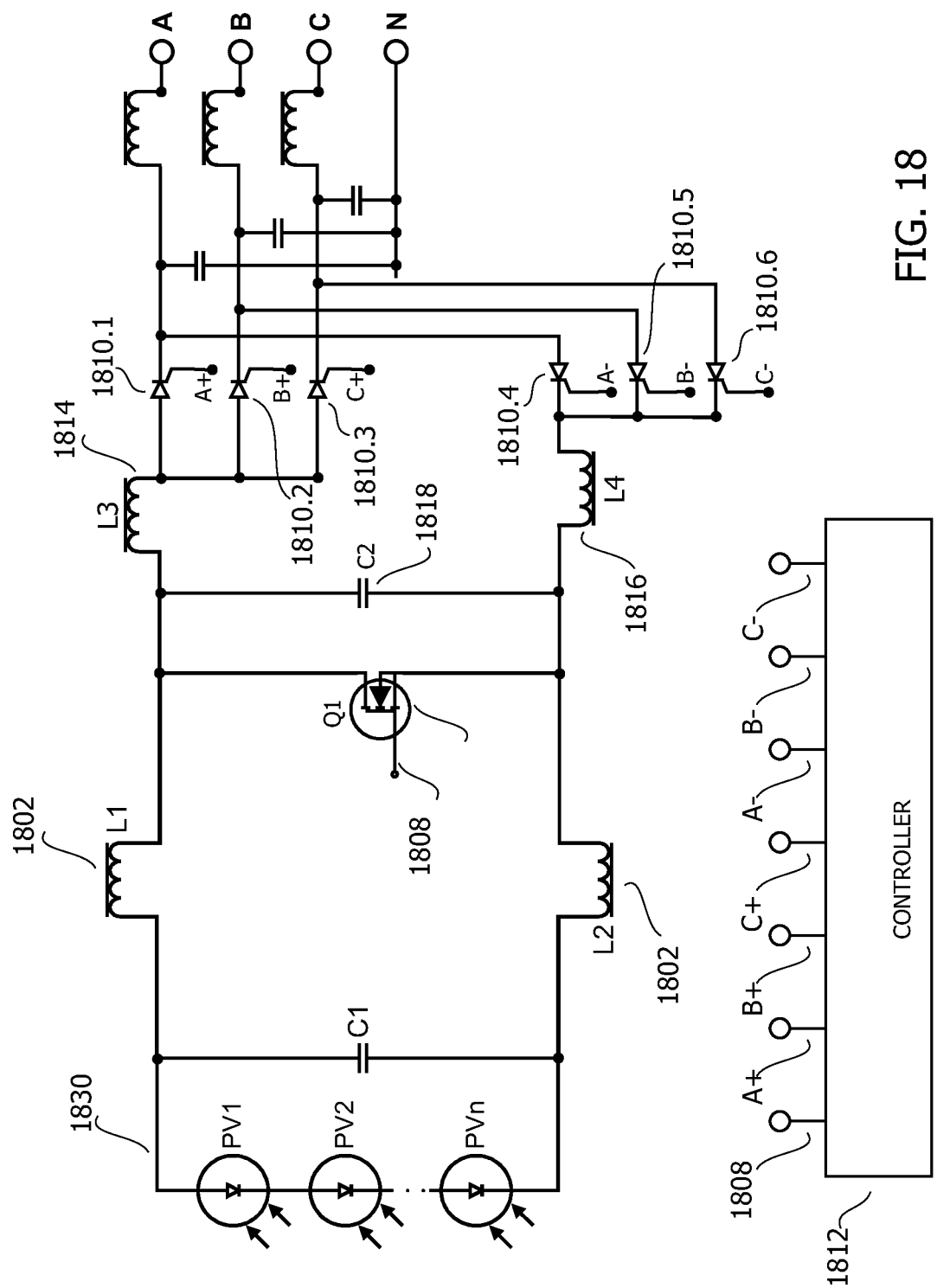
FIG. 18 is an example of a three phase pulse amplitude modulated current converter according to the present invention, configured as a wye output circuit.

FIG. 18 is an example of a circuit according to the present invention, wherein the circuit can be configured from time to time to charge up the coils L1 1802 and L2 1804, as previously described hereinbefore. The charge in the coils is then provided to two output terminals as previously described as related to FIG. 16 and FIG. 17. The output stage is in a wye configuration.

In the example of FIG. 18, six thyristors 1810.1 to 1810.6 (herein after referred to generally as "1810.*n*") provide ON/OFF switching in each of six lines to three output terminals (A, B, C). Control signals to the control gates of the thyristors 1810.*n* are provided by a controller 1812, wherein the controller 1812 includes logic, a programmed microprocessor, or other means for making decisions and generating the appropriate control signals in accordance with the method of the present invention. In some embodiments MOSFETs are used instead of the thyristors 1810.*n*. Thyristors generally are slower than MOSFETs. In embodiments using thyristors 1810.*n*, some embodiments provide a smoothing circuit comprising a coil L3 1814 in the high side branch, a coil L4 1816 in the low side branch, and a capacitor C2 1818. The smoothing circuit 1814, 1816, 1818 provides for a longer time period of current pulses, thereby accommodating the slower response times of thyristors.

A switch Q1 1806, typically a MOSFET, is driven ON in response to a signal on line 1808 from the controller 1812, thereby charging the coils L1 1802 and L2 1804 with current from the photovoltaic panel 1830, as described in the operation of the two-phase system hereinbefore. Looking to the example of FIG. 16, wherein we want to drive current from Phase B to Phase A, then from Phase B to Phase C.

Figure 19:
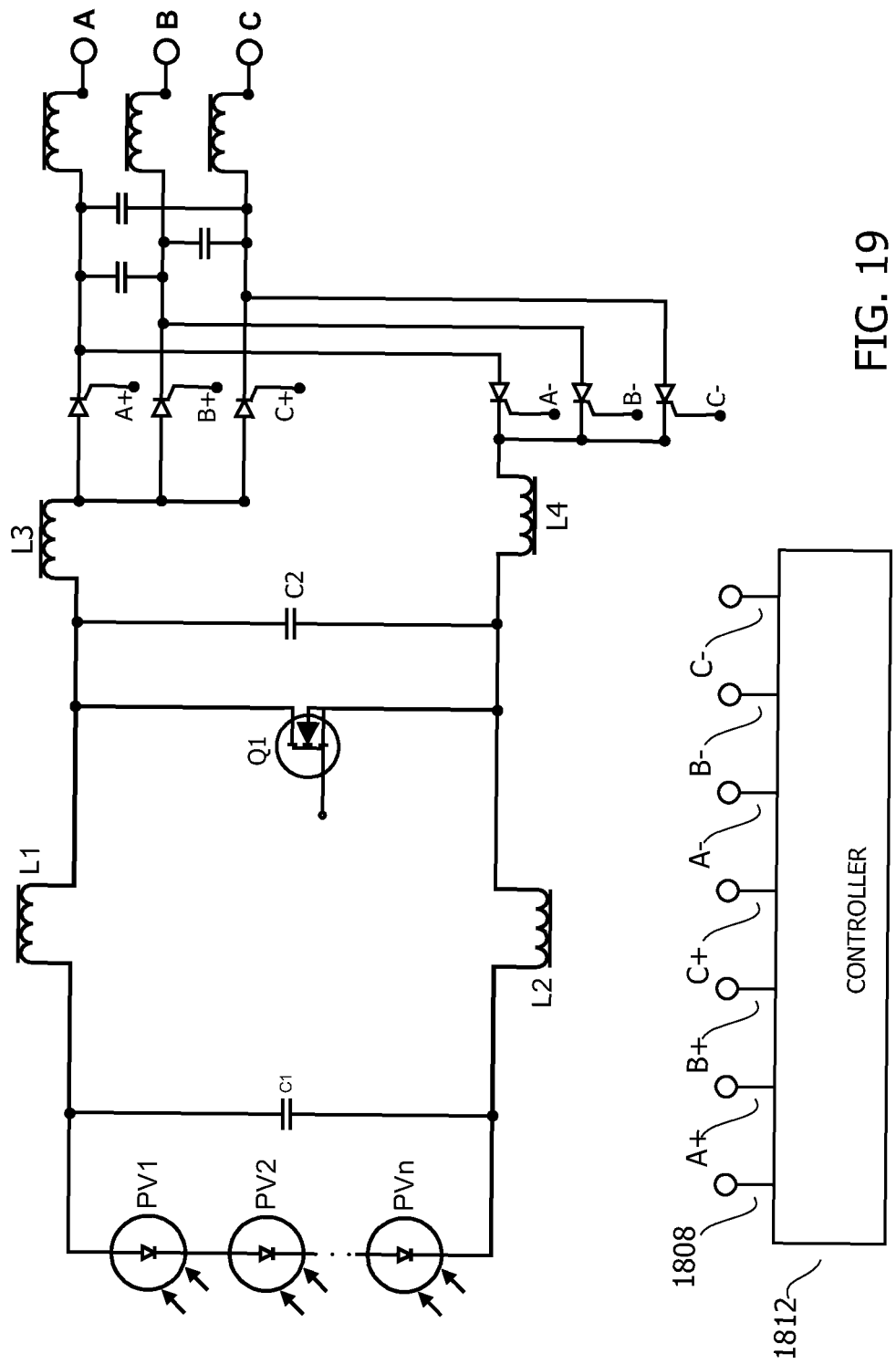
FIG. 19 is an example of a three phase pulse amplitude modulated current converter according to the present invention, configured as a delta output circuit.

FIG. 19 presents an embodiment of the present invention similar to that of FIG. 18 but with the output stage configured as a delta circuit.

Figure 20:
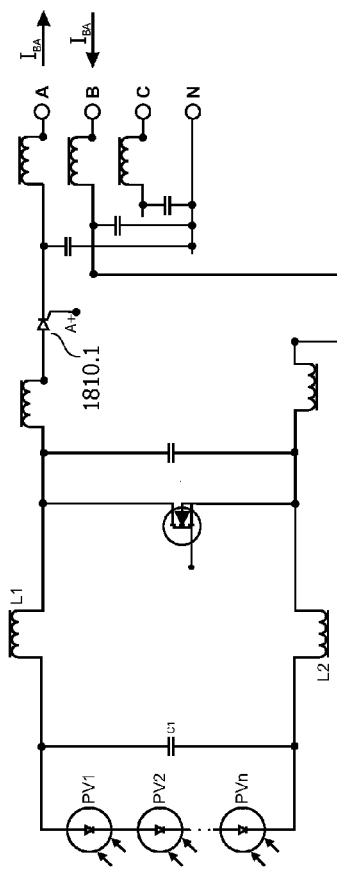
FIG. 20 shows the current path for an exemplary conversion cycle related to the current $I_{BA}$, as illustrated in FIG. 16.
Figure 21:
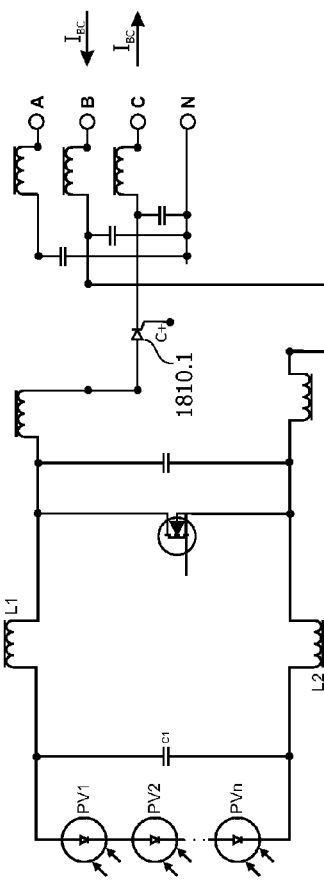
FIG. 21 shows the current path for an exemplary conversion cycle related to the current $I_{BC}$, as illustrated in FIG. 16.

To illustrate the commutation effect of the thyristors, FIG. 20 and FIG. 21 show only those thyristors that are turned on, and unpowered lines are removed for clarity. Looking to FIG. 20, controller 1812 turns on thrystor B−1810.5 and thyristor A+1810.1 with transistor Q1 1806 off. Coils L1 1802 and L2 1804 are no longer connected through the transistor Q1 1806, therefore their current is provided into terminal A, and terminal B is the return path. When terminals B and A have been connected for a predetermined time (to be discussed hereinafter), thyristor A+1810.1 is turned off and thyristor C+1810.3 is turned on, as shown in FIG. 21.

The process as just described is repeated so long as the phases are within a given sixty degree range. In each case, the thyristor first turned ON will result in the greater voltage change from the common reference. After a time, the thyristor that will result in the lower voltage change is turned ON. Therefore we see that during a given sixty degree period the common reference point is always the same, and during the first thirty degrees one phase is farther away from the common reference, and during the second thirty degrees the other phase is farther away. To include all twelve thirty degree time phases, we can determine the following thyristors to turn ON first, then second for each window per Table 1.

TABLE 1

| | Phase | | | | | | | | | | | |
|---|---|---|---|---|---|---|---|---|---|---|---|---|
| | 0-30 | 30-60 | 60-90 | 90-120 | 120-150 | 150-180 | 180-210 | 210-240 | 240-270 | 270-300 | 300-330 | 330-360 |
| $T_{S1}$ | C−B+ | C−A+ | A+C− | A+B− | B−A+ | B−C+ | C+B− | C+A− | A−C+ | A−B+ | B+A− | B+C− |
| $T_{S2}$ | C−A+ | C−B+ | A+B− | A+C− | B−C+ | B−A+ | C+A− | C+B− | A−B+ | A−C+ | B+C− | B+A− |

In Table 1 the annotations refer to the thyristor labels per FIG. 18. For example, "C−B+" indicates to turn on thyristors C−1810.6 and B+1810.2. $T_{S1}$ is the first time period, $T_{S2}$ is the second time period, to be define hereinafter.

Figure 22:
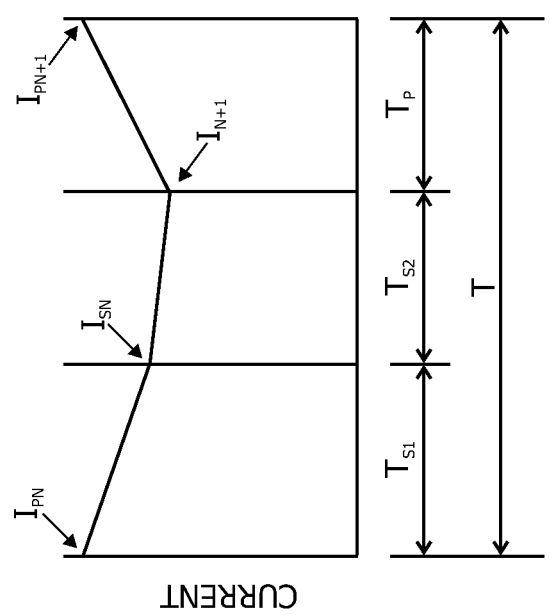
FIG. 22 defines current and time terms as used in various equations.

FIG. 22 defines certain time periods and annotation convention, to be used in the following discussion. During time period $T_{S1}$ current is driven at an initial value of $I_{PN}$ from the common reference to the first (greater difference in voltage, as previously discussed) power rail, the current diminishing to $I_{SN}$ at the end of the time period $T_{S1}$. At that point the next set of thyristors are turned on (see Table 1) for a time $T_{S2}$. The current initially has a value of $I_{SN}$, and a value of $I_{N+1}$ at the end of the time period $T_{S2}$. All thyristors are then turned OFF, and the transistor Q1 1806 is driven on by the controller 1812, which provides a signal on line 1808. With Q1 1806 turned ON, the coils L1 1802 and L2 1804 are recharged by the photovoltaic panel 1830. The period T is a fixed time period, therefore we can state $$T_P = T - T_{S1} - T_{S2}.$$

Time period T should be related to a higher frequency than the frequency of the grid being powered. In one embodiment the period T is related to a frequency of 504 times the frequency of the grid, wherein the grid frequency is 60 Hz in the United States and is 50 Hz in most of the rest of the world.

The time periods of FIG. 22 can be determined in the following manner:

$$I_{sn} = I_{pn} - \frac{(V_{o1} - V_i)}{L} T_{s1} \quad [1]$$

where $V_{O1}$ is defined as the open circuit voltage for the power rail that is to be driven first, Vi is the voltage from the photovoltaic panel 1830, and L is the equivalent inductance of the two coils L1 1802 and L2 1804, including the effect of mutual inductance.

$$I_{n+1} = I_{sn} - \frac{(V_{o2} - V_i)}{L} T_{s2} \quad [2]$$

where $V_{O2}$ is defined as the open circuit voltage for the power rail that is to be driven second. Referring to FIG. 22, $$I_{pn+1} = I_{n+1} + V_i \frac{(T - T_{s1} - T_{s2})}{L} \quad [3]$$

$$= I_{pn} - \frac{(V_{o1} - V_i)}{L} T_{s1} - \frac{(V_{o2} - V_i)}{L} T_{s2} + V_i \frac{(T - T_{s1} - T_{s2})}{L}$$

By expanding terms from Equation [3] we get:

$$I_{pn+1} = I_{pn} + \frac{(-V_{01}T_{s1} + V_iT_{s1} - V_{02}T_{s2} + V_iT_{s2} + V_iT - V_iT_{s1} - V_iT_{s2})}{L} \quad [4]$$

which after dropping out cancel terms results in:

$$I_{pn+1} = I_{pn} + \frac{(V_iT - V_{01}T_{s1} - V_{02}T_{s2})}{L}. \quad [5]$$

We find the average current during the time period $T_{S1}$ by:

$$i_{oave1} = K_R V_{01} = \frac{(I_{pn} + I_{sn})}{2} \frac{T_{s1}}{T} = I_{pn} \frac{T_{s1}}{T} - \frac{(V_{01} - V_i)}{2L} \frac{T_{s1}^2}{T} \quad [6]$$

where $K_R$ is a conductance term controlled by a slow "outer loop" to provide the current needed. Now, rewriting terms:

$$\frac{V_{01} - V_i}{2L} \frac{T_{s1}^2}{T} - \frac{I_{pn}}{T} T_{s1} + i_{oave1} = \phi \quad [7]$$

$$\frac{V_{01} - V_i}{2L} \frac{1}{T} = A1; \quad \frac{I_{pn}}{T} = B1; \quad i_{oave1} = C1$$

We define the following terms and solve for $T_{S1}$ by:

$$T_{s1(1,2)} = \frac{B1 \pm \sqrt{(B1^2 - 4A1C1)}}{2A1}. \quad [8]$$

Similarly for $T_{S2}$:

$$i_{oave2} = K_R V_{02} \quad [9]$$
$$= \frac{(I_{sn} + I_{n+1})}{2} \frac{T_{s2}}{T}$$
$$= I_{pn} \frac{T_{s2}}{T} - \frac{(V_{01} - V_i)T_{s1}T_{s2}}{LT} - \frac{(V_{02} - V_i)T_{s2}^2}{2LT}$$

$$\frac{V_{02} - V_i}{2LT} T_{s2}^2 - \frac{I_{pn} - \frac{1}{L}(V_{01} - V_i)T_{s1}}{T} \times T_{s2} + i_{o\,ave2} = \phi \quad [10]$$

As before we define the terms:

$$\frac{V_{o2} - V_i}{2LT} = A2; \quad \frac{I_{pn} - \frac{1}{L}(V_{01} - V_i)T_{s1}}{T} = B2; \quad i_{o\,ave2} = C2; \quad [11]$$

$$\text{then } T_{s2(1,2)} = \frac{B2 \pm \sqrt{(B2^2 - 4A2C2)}}{2A2}$$

$$i_{i\,ave} = i_{0\,ave1} + i_{0\,ave2} + \frac{(I_{n+1} + I_{pn+1})}{2}\frac{(T - T_{s1} - T_{s2})}{T} \quad [12]$$

$$i_{i\,ave} = i_{0\,ave1} + i_{0\,ave2} + \quad [13]$$

$$\left(I_{pn} + \frac{1}{L}\left(-V_{01}T_{s1} - V_{02}T_{s2} + V_i\frac{T + T_{s2} + T_{s1}}{2}\right)\right)\left(1 - \frac{T_{s1} + T_{s2}}{T}\right)$$

$$V_{i\,n+1} - V_i = \Delta V_i \frac{1}{1 + \frac{R_{PV}C_i}{T}}(E_{PV} - R_{PV}i_{i\,ave} - V_{in})$$

where $E_{PV}$ and $R_{PV}$ are the Thevenin Equivalent of the photovoltaic panel.

Obviously a solar powered current source will eventually be unable to provide enough current to meet the demand of the load. As the target current approaches the maximum available the target current is gradually reduced to minimize THD.

RESOLUTION OF CONFLICTS

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

What is claimed is:

1. A system for converting direct current electrical power into three phase alternating current electrical power, the system comprising:
   two or more direct electrical current sources;
   a pulse amplitude modulated current converter ("converter") connected to each direct electrical current source, wherein each of the converters receives direct electrical current from its respective direct electrical current source and provides a first pulse amplitude modulated current pulse at a first phase at a first output terminal of the converter and a second pulse amplitude modulated current pulse at a second phase at a second output terminal and a third pulse amplitude modulated current pulse at a third phase at a third output terminal and further wherein the first output terminal of each converter is electrically connected in parallel with the first output terminals of all other converters in the system and the second output terminal of each converter is electrically connected in parallel with the second output terminals of all other converters in the system and the third output terminal of each converter is electrically connected in parallel with the third output terminals of all other converters in the system, whereby the first and the second and the third current pulses of at least two converters are out of phase with respect to the first and the second and the third current pulses of each other, thereby summing the current pulses of each phase of all of the converters such that a signal modulated onto the pulse output of the converters is demodulated, wherein the current pulses are modified on a cycle-by-cycle basis to cancel an effect of transient noise on the signal.

2. The system according to claim 1, wherein the current pulse of each converter is out of phase with respect to the current pulses of all other converters of the same voltage phase.

3. The system according to claim 1, wherein the signal is a sixty-cycle alternating current voltage.

4. The system according to claim 1, wherein the signal is an approximately fixed value of direct current voltage.

5. The system according to claim 1, wherein the signal is a square wave.

6. The system according to claim 1, wherein the signal is a triangle wave.

7. The system according to claim 1, wherein the signal is a Gaussian wave.

8. The system according to claim 1, wherein the signal includes a communications signal for communicating data.

9. The system according to claim 8, wherein the communications signal is superimposed upon the signal.

10. The system according to claim 8, wherein the communications signal communicates data from a given converter to at least one other converter in the system.

11. The system according to claim 8, wherein the communications signal communicates data from a given converter to all other converters in the system.

12. The system according to claim 8, wherein the data comprises phase data.

13. The system according to claim 8, wherein the data comprises control commands.

14. The system according to claim 8, wherein the data comprises operational data.

15. The system according to claim 1, wherein the two or more direct electrical current sources are photovoltaic panels.

16. The system according to claim 1, wherein the two or more direct electrical current sources are wind powered generators.

17. The system according to claim 1, wherein the two or more direct electrical current sources are tidal power generators.

18. The system according to claim 1, wherein the two or more direct electrical current sources are piezoelectric power generators.

19. The system according to claim 1, wherein the two or more direct electrical current sources are batteries.

20. A system for converting direct current electrical power into three phase alternating current electrical power, the system comprising:
    two or more direct electrical current sources;
    a pulse amplitude modulated current converter ("converter") connected to each direct electrical current source, wherein each of the converters receives direct electrical current from its respective direct electrical current source and provides a first pulse amplitude modulated current pulse at a first phase at a first output terminal of the converter and a second pulse amplitude modulated current pulse at a second phase at a second output terminal and a third pulse amplitude modulated current pulse at a third phase at a third output terminal and further wherein the first output terminal of each converter is electrically connected in parallel with the first output terminals of all other converters in the system and the second output terminal of each converter is electrically connected in parallel with the second output terminals of all other converters in the system and the third output terminal of each converter is electrically connected in parallel with the third output terminals of all other converters in the system, whereby the first and the second and the third current pulses of at least two converters are out of phase with respect to the first and the second and the third current pulses of each other, thereby summing the current pulses of each phase of all of the converters such that a signal modulated onto the pulse output of the converters is demodulated, wherein the two or more direct electrical current sources are chemical power generators or geothermal power generators.

\* \* \* \* \*